(12) United States Patent
Segev et al.

(10) Patent No.: US 11,778,582 B2
(45) Date of Patent: Oct. 3, 2023

(54) SECURE LOCATION MEASUREMENT SHARING

(71) Applicant: Intel Corporation, Santa Clara, CA (US)

(72) Inventors: Jonathan Segev, Tel Mond (IL); Qinghua Li, San Ramon, CA (US); Feng Jiang, Santa Clara, CA (US); Xiaogang Chen, Portland, OR (US); Emily Qi, Gig Harbor, WA (US); Hassan Yaghoobi, San Jose, CA (US); Gadi Shor, Tel Aviv (IL); Robert Stacey, Portland, OR (US); Dibakar Das, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 41 days.

(21) Appl. No.: 17/095,445

(22) Filed: Nov. 11, 2020

(65) Prior Publication Data
US 2021/0068070 A1      Mar. 4, 2021

Related U.S. Application Data

(60) Provisional application No. 62/933,889, filed on Nov. 11, 2019, provisional application No. 62/933,633, filed on Nov. 11, 2019.

(51) Int. Cl.
| | |
|---|---|
| *H04W 64/00* | (2009.01) |
| *H04W 72/044* | (2023.01) |
| *H04W 12/02* | (2009.01) |
| *H04W 12/08* | (2021.01) |
| *H04W 80/12* | (2009.01) |

(52) U.S. Cl.
CPC ........ *H04W 64/003* (2013.01); *H04W 12/02* (2013.01); *H04W 12/08* (2013.01); *H04W 72/044* (2013.01); *H04W 80/12* (2013.01)

(58) Field of Classification Search
CPC ... H04W 64/003; H04W 12/02; H04W 12/08; H04W 72/044; H04W 80/12; H04W 12/009; H04W 12/63; H04W 12/73; H04W 12/75; H04W 12/104; H04W 72/048; H04W 88/08; H04W 28/16; H04L 67/10
See application file for complete search history.

(56) References Cited

U.S. PATENT DOCUMENTS

| | | | |
|---|---|---|---|
| 2019/0253255 A1* | 8/2019 | Mani | G07C 9/00 |
| 2020/0059787 A1* | 2/2020 | Whitaker | H04L 63/0807 |
| 2021/0359856 A1* | 11/2021 | Shankar | G06Q 20/38 |
| 2022/0312513 A1* | 9/2022 | Chitrakar | H04W 76/12 |

* cited by examiner

*Primary Examiner* — Mazda Sabouri
(74) *Attorney, Agent, or Firm* — Eversheds Sutherland (US) LLP

(57) ABSTRACT

This disclosure describes systems, methods, and devices related to secure location measurement sharing. A device may cause to send a first indication associated with a location of the device to a cloud server. The device may cause to send a second indication associated with a ranging information of an access point (AP), wherein the AP is connected to the cloud server. The device may identify an access token received from the cloud server, wherein the access token is associated with providing anonymized AP location information to the AP, and wherein the access token is associated with accessing channel allocation from a channel access database.

18 Claims, 20 Drawing Sheets

SECURE LOCATION MEASUREMENT SHARING

CROSS-REFERENCE TO RELATED APPLICATION(S)

This application claims the benefit of U.S. Provisional Application No. 62/933,633, filed Nov. 11, 2019, and U.S. Provisional Application No. 62/933,889, filed Nov. 11, 2019, both disclosures of which are incorporated herein by reference as if set forth in full.

TECHNICAL FIELD

This disclosure generally relates to systems and methods for wireless communications and, more particularly, to secure location measurement sharing.

BACKGROUND

Wireless devices are becoming widely prevalent and are increasingly requesting access to wireless channels. The Institute of Electrical and Electronics Engineers (IEEE) is developing one or more standards that utilize Orthogonal Frequency-Division Multiple Access (OFDMA) in channel allocation.

DETAILED DESCRIPTION

Figure 1:
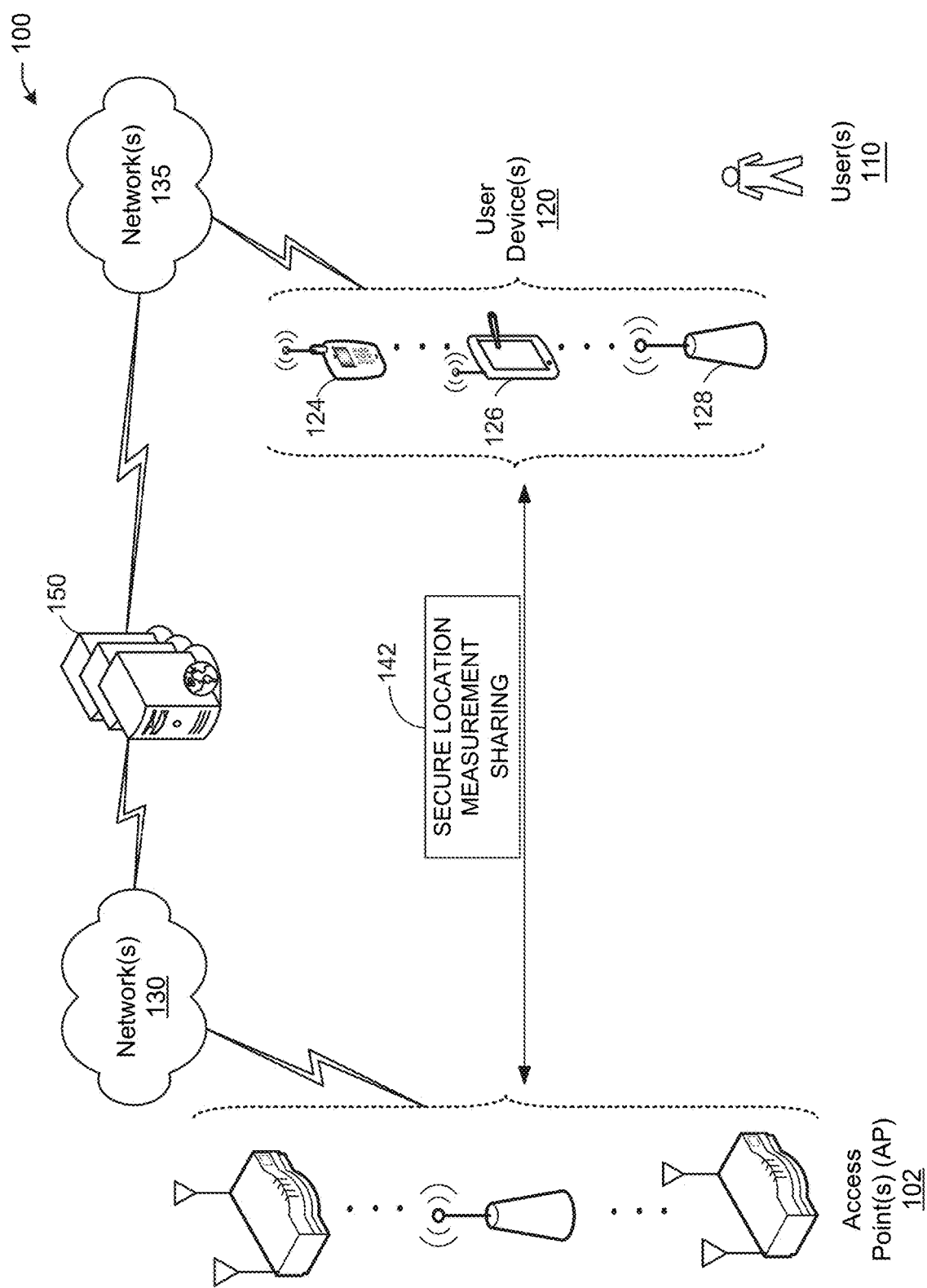
FIG. 1 is a network diagram illustrating an example network environment for secure location measurement sharing, in accordance with one or more example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in or substituted for, those of other embodiments. Embodiments set forth in the claims encompass all available equivalents of those claims.

In the 6 gigahertz (GHz) band, there are incumbent radios. A Wi-Fi radio (referring to a Wi-Fi device) needs to honor the incumbent radios whenever a Wi-Fi radio uses the band (e.g., a Wi-Fi device trying to access a 6 GHz band). The interference from the Wi-Fi device to the incumbent needs to be low enough e.g., 6 dB below the received incumbent signal power. Therefore, the transmission power of the Wi-Fi device needs to be set properly.

The Federal Communications Commission (FCC) has set regulations that are location-dependent for the use of the 6 GHz band. The regulations require the Wi-Fi stations to be able to acquire their location and based on that to access a DB for the availability of channel, bandwidth, and power transmission. In many usages the AP station (AP) does not normally include a GPS baseband which can allow it to identify its location, thus there is an increasing interest in allowing the client STA to make its location available to the AP. However, for privacy purposes, power save and other reasons (e.g. solution simplicity) a client STA would prefer to not share its location with the AP, thus an incentive for a client STA to allow an AP to derive its location in a manner that is secured and private needs to be made available. Client device location was proposed for determining the transmission power such that the AP is fed a location from the STA to the AP.

Previous solutions require a client STA to share location directly with AP, this is not private and insecure. Furthermore, there is no incentive for a client STA to enable the AP to infer its location of the client STA capabilities e.g., if the 6 GHz band is already in transmission there is no incentive by the client to continue providing its range measurement with the AP.

There is no way for the AP to advertise how fresh its location is and how soon it needs refreshing or improving (e.g. it got measurements that indicate the AP location within a range of 20 meters but can do much better if it knows its location within a range of 1 m).

The use of REVmc FTM was proposed in the past for ranging and location purposes but there is no protection mechanism in REVmc FTM. The better the AP location is the more channels and transmission power allowed but there is no way on the AP to fine-tune its needs for location awareness.

In some examples, due to the nature of orthogonal frequency-division multiplexing (OFDM) modulation, the current 802.11az ("11az") secure sounding signal is vulnerable to the attacker with super-computing power. Besides, the current 11az secure sounding does not apply cyclic shift diversity (CSD) shifts across multiple sounding antennas, unintentional beamforming effect may occur such that a third party device not following the 802.11 specifications may contend for the channel before the sounding ends.

Example embodiments of the present disclosure relate to systems, methods, and devices for secure Location Measurement sharing with client incentive for automated frequency coordination (AFC) AP.

In one embodiment, a secure location measurement sharing system may facilitate that an AP may advertise 6 GHz support using neighbor awareness networking (NAN) (as a service or application) or 11aq (service) or a similar protocol for services to allow a client STA to identify the need for AP location. The client STA will share its location with a trusted cloud server (server application) in a trusted manner. Both the client and the AP device are connected to the trusted cloud server. The cloud server will provide the client STA with an access token that is mandatory for gaining connectivity using the 6 GHz channels or possibly any channel. The access token will be required to obtain 6 GHz (or any other channel) access to the AP such that there is an incentive on the STA side to provide and refresh its location (trading connectivity with location). The Cloud server will update the AP STA with the AP location or allowed frequency and power control. The availability of the 6 GHz band is essential to market success and future increasing service demand for Wi-Fi connectivity.

Previous proposals to share client STA location were made using non-trusted methods that shared the client STA's location with the AP that is not always trusted (e.g. a residential AP and visiting client, an AP in a shop, and a customer of the shop). An AP STA does not know which client STA provided the location. The cloud service can convert a set of range measurements into an AP Location vs. an individual range. The allocation of power and channels by the cloud service can be variable e.g. time dependent on the last received measurement and measurements become stale.

Example embodiments of the present disclosure relate to systems, methods, and devices for security and robustness enhancements for 11az secure ranging.

In one embodiment, a secure ranging system may facilitate that in addition to the original sounding signal, the transmitter sends a delayed copy of the original sounding signal on one or multiple antennas with an amplitude and a phase unknown to the attacker.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 is a network diagram illustrating an example network environment of secure location measurement sharing, according to some example embodiments of the present disclosure. Wireless network 100 may include one or more user devices 120 and one or more access points(s) (AP) 102, which may communicate in accordance with IEEE 802.11 communication standards. The user device(s) 120 may be mobile devices that are non-stationary (e.g., not having fixed locations) or may be stationary devices.

Figure 15:
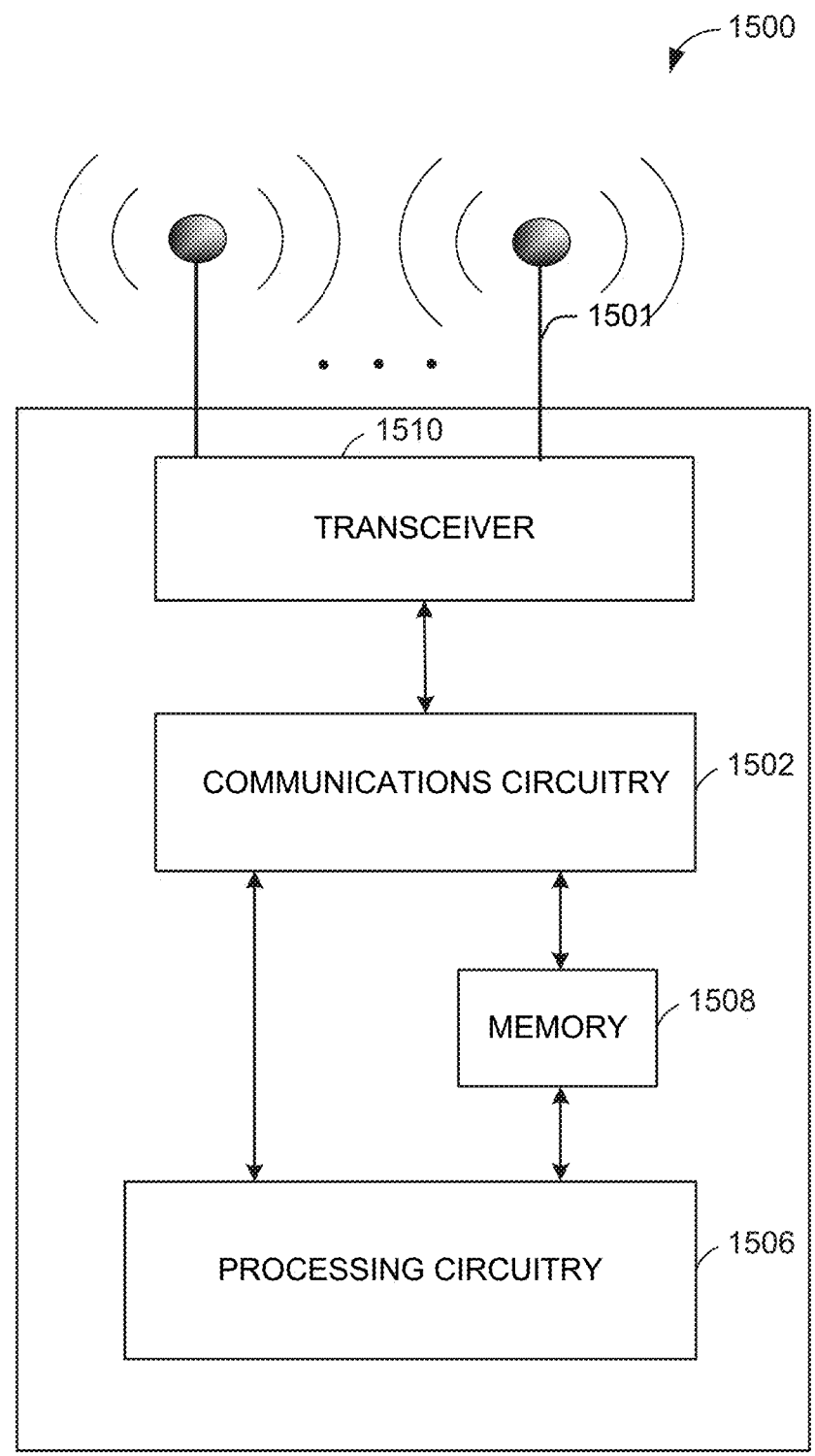
FIG. 15 illustrates a functional diagram of an exemplary communication station that may be suitable for use as a user device, in accordance with one or more example embodiments of the present disclosure.
Figure 16:
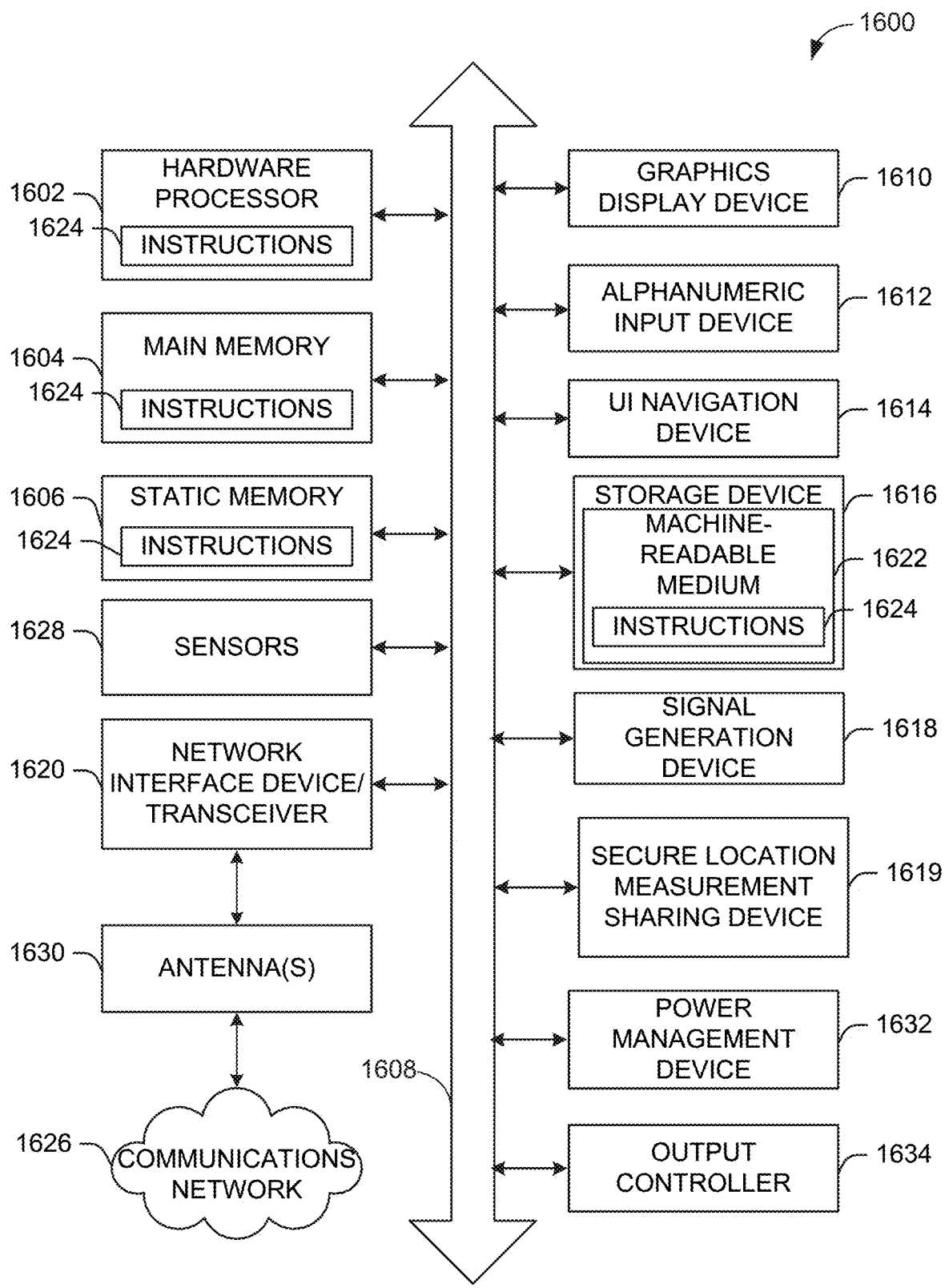
FIG. 16 illustrates a block diagram of an example machine upon which any of one or more techniques (e.g., methods) may be performed, in accordance with one or more example embodiments of the present disclosure.

In some embodiments, the user devices 120 and the AP(s) 102 may include one or more computer systems similar to that of the functional diagram of FIG. 15 and/or the example machine/system of FIG. 16.

In one or more embodiments, and with reference to FIG. 1, AP(s) 102 and/or the one or more user device(s) 120 may communicate with one or more cloud servers 150.

One or more illustrative user device(s) 120 and/or AP(s) 102 may be operable by one or more user(s) 110. It should be noted that any addressable unit may be a station (STA). An STA may take on multiple distinct characteristics, each of which shapes its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber-coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), or 60 GHZ channels (e.g. 802.11ad, 802.11ay). 800 MHz channels (e.g. 802.11ah). The communications antennas may operate at 28 GHz and 40 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

The one or more cloud servers 150 may be logical servers that may be built, hosted, and delivered through a cloud computing platform over the Internet. Cloud servers include the capabilities and functionality of a typical server but are accessed remotely from a cloud service provider. A cloud server may also be called a virtual server or virtual private server.

In one embodiment, and with reference to FIG. 1, AP 102 may facilitate secure location measurement sharing 142 with one or more user devices 120.

In one embodiment, a secure location measurement sharing system may facilitate that an AP 102 may advertise 6 GHz support using NAN (as a service or application) or 11aq (service) or a similar protocol for services to allow a client STA 120 to identify the need for AP 102 location. The client STA 120 may share its location with a trusted cloud server 150 (server application) in a trusted manner. Both the client STA and the AP devices may be connected to the trusted cloud server 150. The cloud server 150 may provide the client STA 120 with an access token that is mandatory for gaining connectivity using the 6 GHz channels or possibly any channel. The access token may be required to obtain 6 GHz (or any other channel) access to the AP 102 such that there is an incentive on the STA 120 side to provide and refresh its location (trading connectivity with location). The Cloud server 150 may update the AP 102 with the AP 102 location or allowed frequency and power control. The availability of the 6 GHz band is essential to market success and future increasing service demand for Wi-Fi connectivity. It is understood that the above descriptions are for purposes of illustration and are not meant to be limiting.

Figure 2:
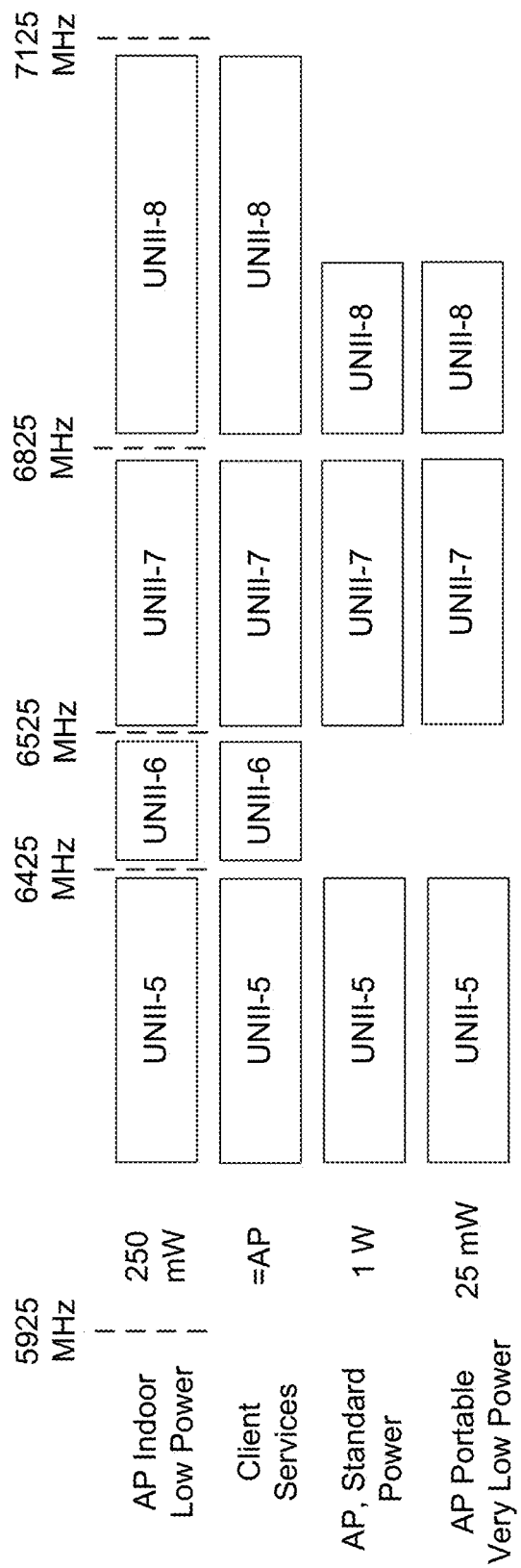
FIG. 2 depicts an illustrative schematic diagram for secure location measurement sharing, in accordance with one or more example embodiments of the present disclosure.

FIG. 2 depicts an illustrative schematic diagram for secure location measurement sharing, in accordance with one or more example embodiments of the present disclosure.

Referring to FIG. 2, there is shown transmission powers of Wi-Fi on the 6 GHz band. In the 6 GHz band, there are incumbent radios. A Wi-Fi radio needs to honor the incumbent radios whenever a Wi-Fi radio uses the band. The interference from the Wi-Fi device to the incumbent needs to be low enough e.g., 6 dB below the received incumbent signal power. Therefore, the transmission power of the Wi-Fi device needs to be set properly.

Figure 3:
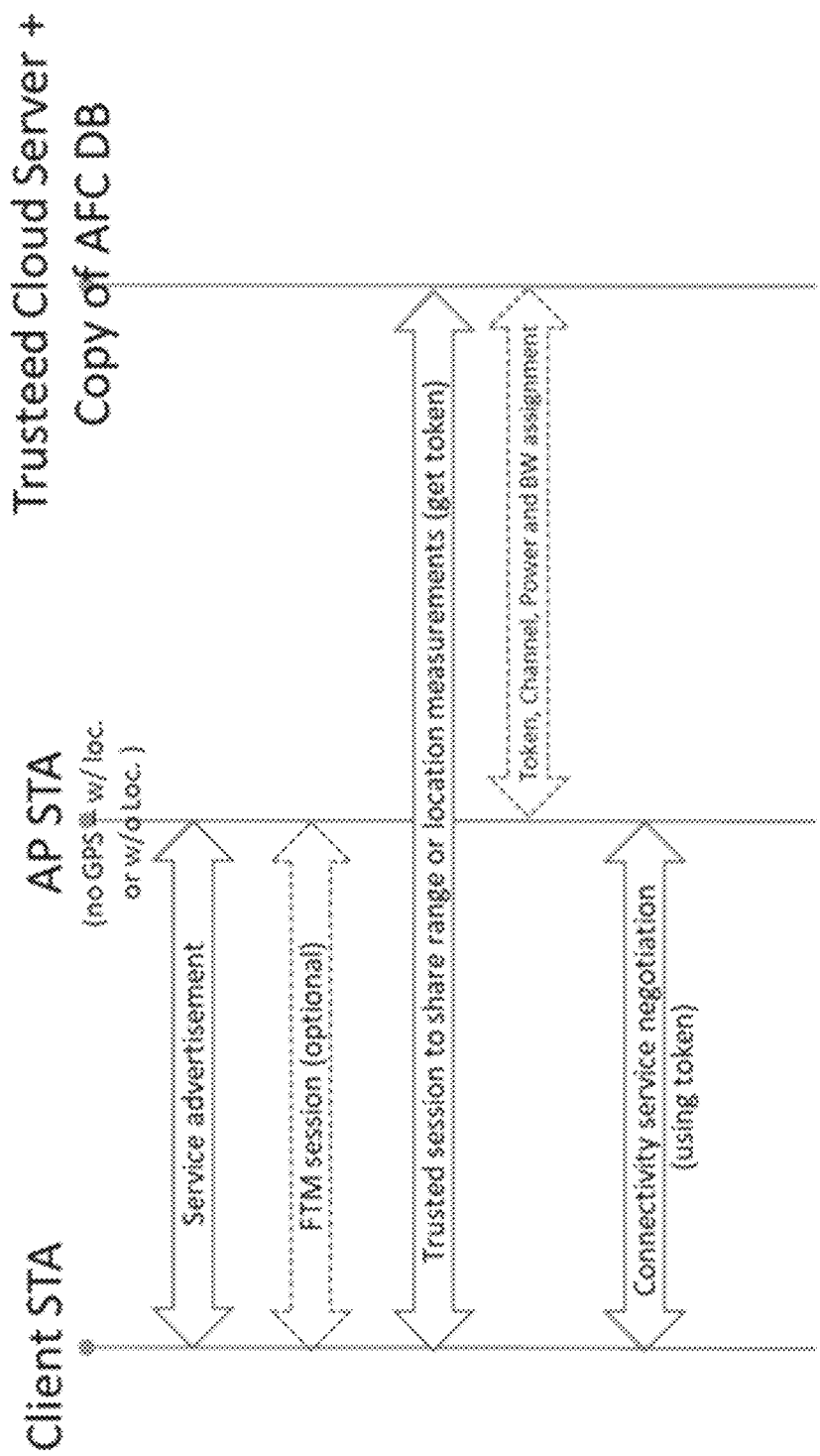
FIG. 3 depicts an illustrative schematic diagram for secure location measurement sharing, in accordance with one or more example embodiments of the present disclosure.

FIG. 3 depicts an illustrative schematic diagram for secure location measurement sharing, in accordance with one or more example embodiments of the present disclosure.

FIG. 3 shows a high-level architecture of the AFC design using a token.

In one or more embodiments, a first step may be performing a service advertisement at the MAC level by the AP. For example, this can be done using 802.11aq messages, vendor-specific information elements (IEs) added to beacons, or implementation of NAN protocol by the AP that advertises a service # (a hash function of the service).

In one or more embodiments, a second stage may be for the client STA to obtain its own location using 802.11-2016 FTM, 802.11az FTM, or using other technologies such as GPS, assisted GPS (AGPS), etc.

In one or more embodiments, in a third step, and with the client STA already preconfigured with cloud server settings and credentials, the client STA may establish a secured service with the cloud service. The cloud service receives the client STA request and may implement an anonymization mechanism or not gather client STA information settings to prevent any privacy issue. The trusted cloud server may maintain its own Federal Communications Commission (FCC) channel access database (DB) for the 6 GHz band or maintain a copy of that, it might require the AP STA to continuously refresh the AP STA location or do it once per activation/reset.

In one or more embodiments, the AP may advertise the need for its own location refresh (time to next refresh) or simply indicate the request for most up to date.

In one or more embodiments, the AP may exert different policy to different types of STAs, e.g. STA without location capabilities (no GPS, no sensors or any other kind of position) are excluded from the need to provide location while smartphones are always required to provide their latest location or distance to the AP STA to gain access to connectivity in 6 GHz band.

In one or more embodiments, the AP STA might be preconfigured with credentials to access the cloud server or may use other methods. Client STAs might be preconfigured with cloud service credentials, they might gain those using public/private key authentication scheme or might use other schemes as pairwise key.

The assigned token might be good for a single use for a single AP, multiuse for a single AP, multiuse for a single network, or multi-AP multi-network with multiuse.

Client STA might share its location with the cloud server, its range to an AP, its angular measurement to the AP, its differential time of arrival from an AP pair or pair or a combination thereof with the cloud server. The token might be valid for a certain time which might also be provided during the assignment, advertised, or preconfigured. The cloud server might use one of a set of tokens already assigned to the AP, might generate a token, and indicate to the AP its assignment to a client, or might use a public/private key scheme to enable authenticity identification of tokens.

Figure 4:
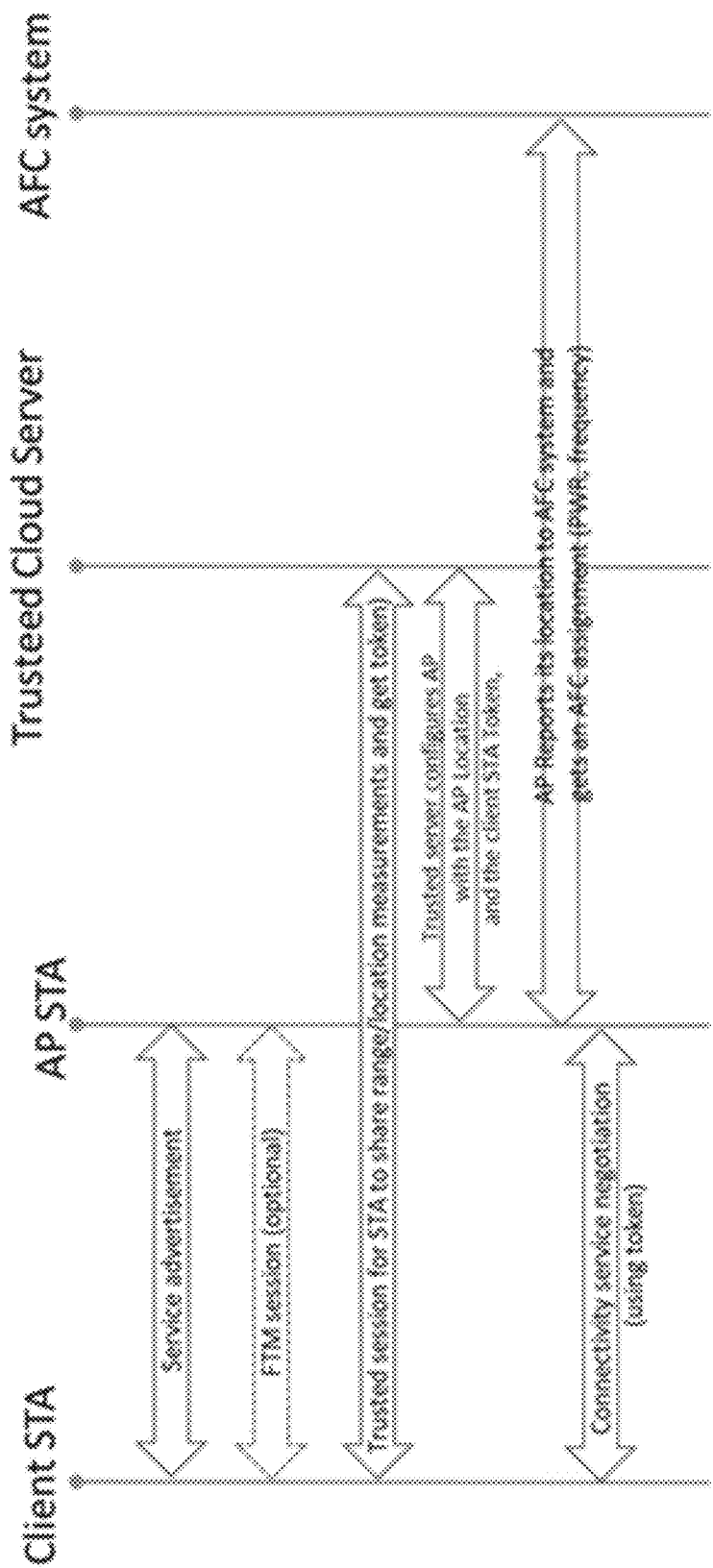
FIG. 4 depicts an illustrative schematic diagram for secure location measurement sharing, in accordance with one or more example embodiments of the present disclosure.

FIG. 4 depicts an illustrative schematic diagram for secure location measurement sharing, in accordance with one or more example embodiments of the present disclosure.

Referring to FIG. 4, there is shown an independent AFC and Trusted cloud server, where the client STA shares private location measurements information with the trusted cloud server which anonymizes the information and configures the AP STA with the resulting AP STA location, the AP STA then uses that information to request an AFC channel availability based on the configure AP location. An AFC is a network resident server that coordinates the use of U-NII-5, U-NII-7, or other spectrums. This architecture and signaling allow for the client STA location to remain anonymous while the AP signaling with the AFC system is the same as one of an AP STA with an independent location. It is understood that the above descriptions are for purposes of illustration and are not meant to be limiting.

In the connectivity service negotiation, the client STA may use 802.1x to provide the AP STA with the token or public/private key encryption and authentication scheme to provide the token to the AP STA. It is understood that the above descriptions are for purposes of illustration and are not meant to be limiting.

Figure 5:
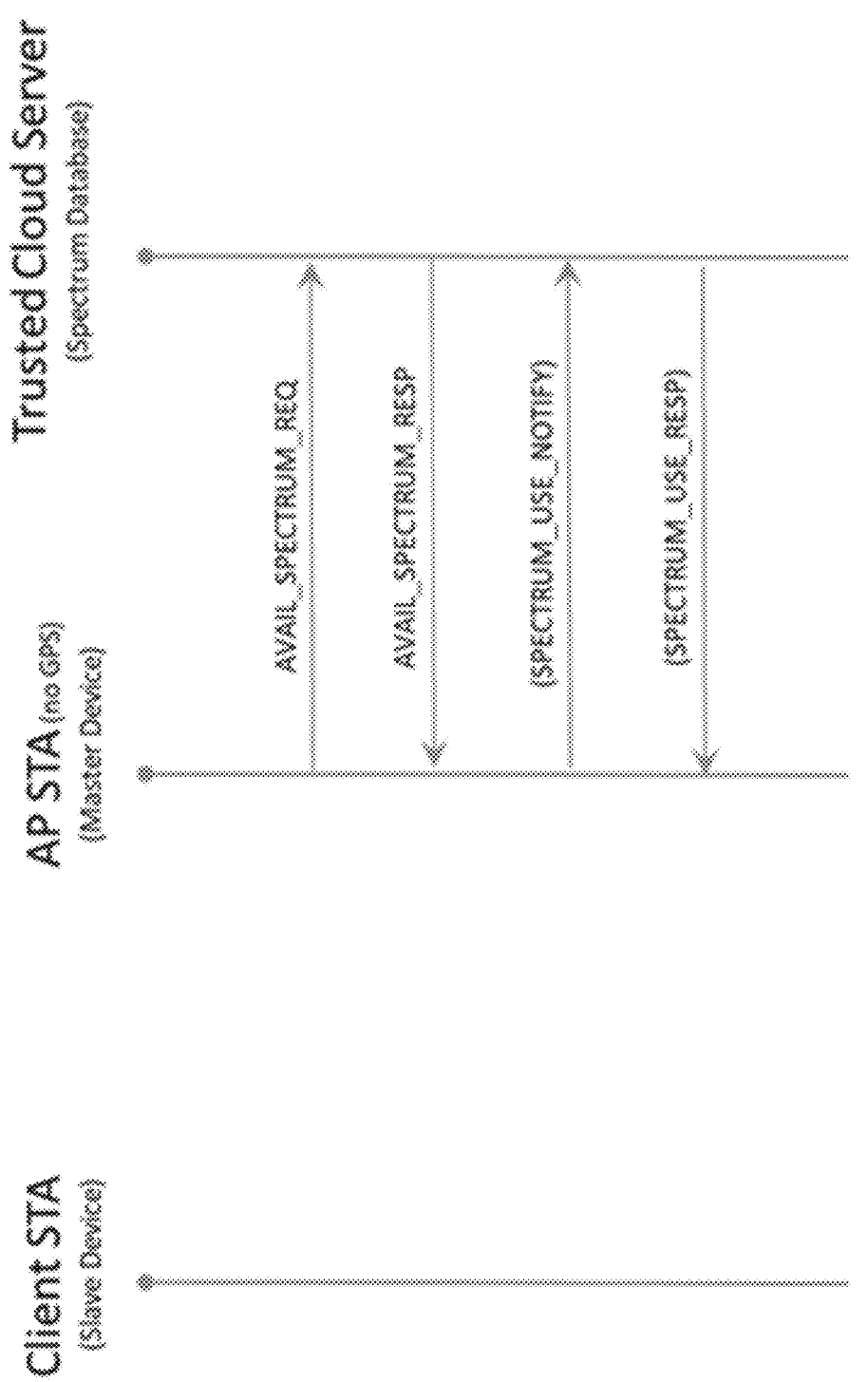
FIG. 5 depicts an illustrative schematic diagram for secure location measurement sharing, in accordance with one or more example embodiments of the present disclosure.

FIG. 5 depicts an illustrative schematic diagram for secure location measurement sharing, in accordance with one or more example embodiments of the present disclosure.

FIG. 5 shows protocol RFC7545 operation where a master-slave requests a frequency availability (AVAIL_SPECTURM_REQ) and based on availability received from the spectrum DB (AVAIL_SPECTRUM_RSP). RFC7545 may define an interoperable specification for information exchange between the WhiteSpace Database (WSDB) and a White Space Device (WSD). The protocol defines access to white spaces, where portions of the radio spectrum that are allocated to licensees are available for non-interfering use.

Figure 6:
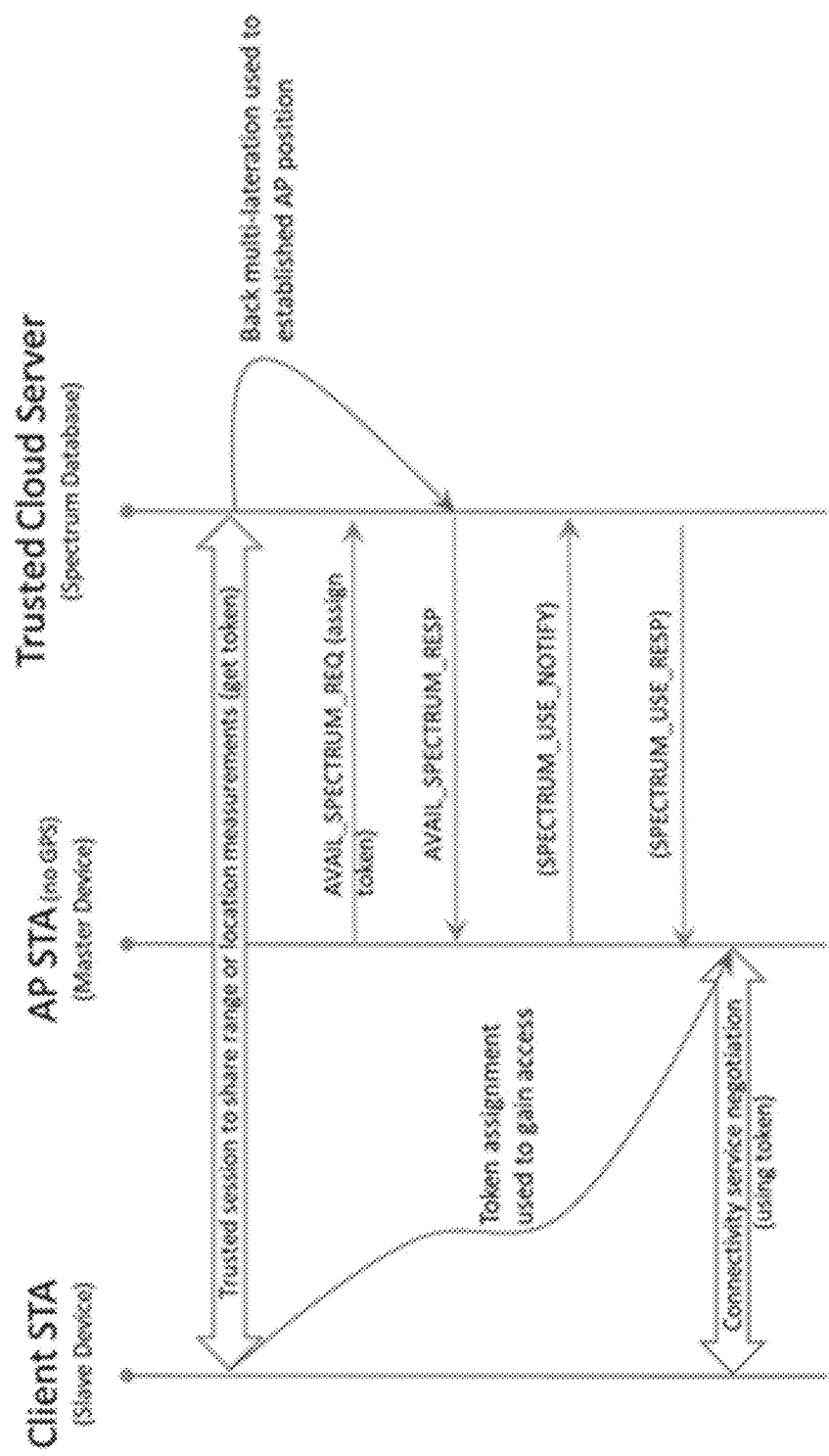
FIG. 6 depicts an illustrative schematic diagram for secure location measurement sharing, in accordance with one or more example embodiments of the present disclosure.

FIG. 6 depicts an illustrative schematic diagram for secure location measurement sharing, in accordance with one or more example embodiments of the present disclosure.

An embodiment of the idea into the protocol of RFC7545 can be seen in FIG. 6 below, the range measurements from the client STA are provided to the cloud server which also derives the AP location and considers client privacy as to not share raw identifiable measurements with the AP.

Referring to FIG. 6, there are shown some possible embodiments of the use of RFC7545.

In one or more embodiments, a secure location measurement sharing system may facilitate a client STA that shares its location measurements and its relative location to an AP STA with a trusted cloud server which anonymizes the information and provide anonymized AP location information to the AP.

In one or more embodiments, a secure location measurement sharing system may facilitate that the AP uses this anonymized location to obtain allowed AFC channel allocation and allowed transmission power.

In one or more embodiments, a secure location measurement sharing system may assign to an AP an AFC channel allocation and allowed transmission power based on the reports from a client STA.

In one or more embodiments, a secure location measurement sharing system may facilitate that the client STA gets access to a connectivity service based on location reports that are made to a trusted server.

In one or more embodiments, a secure location measurement sharing system may facilitate that the AP is configured with a token that identifies the client STA which was allowed access to the service.

In one or more embodiments, a secure location measurement sharing system may facilitate that the AP obtains its location based on multiple measurements from multiple client STAs that are accumulated and anonymized by the trusted server resulting in a single AP STA fix and accuracy estimate.

In one or more embodiments, a secure location measurement sharing system may facilitate that the location reporting is made over HTTPS protocol.

In one or more embodiments, a secure location measurement sharing system may facilitate that the AP provisions access to limited connectivity service to enable location measurement reports from client STA to a trusted server and to receive tokens by client STA but require configuring by the trusted service to gain additional connectivity services.

In one or more embodiments, a secure location measurement sharing system may use 802.1x to enable internet access to a trusted server to make location reports prior to access to other ports that enables connectivity services.

In one or more embodiments, a secure location measurement sharing system may use cellular connectivity to connect to a trusted server and make location measurement reports.

It is understood that the above descriptions are for purposes of illustration and are not meant to be limiting.

Figure 7:
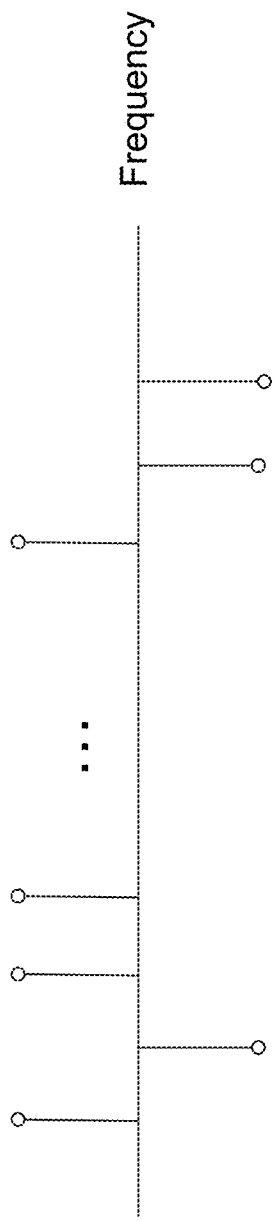
FIG. 7 depicts an illustrative schematic diagram for secure ranging, in accordance with one or more example embodiments of the present disclosure.

FIG. 7 depicts an illustrative schematic diagram for secure ranging, in accordance with one or more example embodiments of the present disclosure.

Referring to FIG. 7, there is shown 8 pre-shared key (PSK) sequence in frequency domain.

In the current 11az specification draft, different 8PSK sequences can be generated in the frequency domain as different sounding signals for the secure ranging as illustrated in FIG. 7. For each secure sounding symbol, an 8PSK sequence is generated, converted into a time-domain waveform, and appended (or prefixed) a zero-power guard interval for the sounding transmission.

Figure 8:
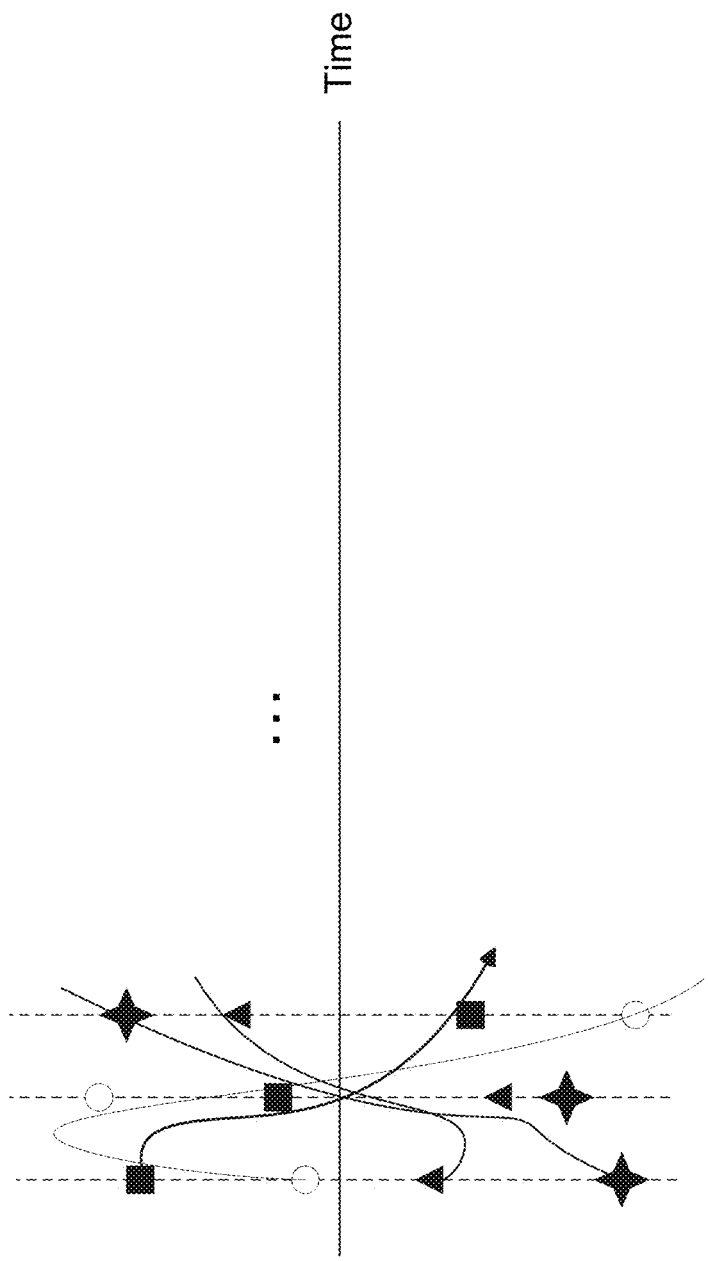
FIG. 8 depicts an illustrative schematic diagram for secure ranging, in accordance with one or more example embodiments of the present disclosure.

FIG. 8 depicts an illustrative schematic diagram for secure ranging, in accordance with one or more example embodiments of the present disclosure.

Referring to FIG. 8, there is shown domain waveforms of four 8PSK sequences.

Each 8PSK sequence has a distinct time domain waveform as illustrated in FIG. 8. Since the beginning part of the waveform is jointly determined by the whole 8PSK sequence and the beginning part is likely to be different for all 8PSK sequences, the attacker may be able to tell which 8PSK sequence is being transmitted by just observing the beginning part of the waveform. This is an inherent problem for OFDM modulation, whose time-domain samples are the linear mixtures of all the symbols on all the subcarriers. Note the symbols on the subcarriers are unknown to the attacker and serves as the security protection for the sounding signal. The attack model proposed by Apple is as follows. The attacker places a receiver very close to the ranging transmitter for high SNRs and line of sight (LOS) dominant channels. Besides, the attacker stores the beginning parts of all the waveforms and compares them with the beginning part of the received waveform. The attacker needs to do millions of sequence comparisons within 2-4 microseconds for making the attack. Namely, if the attacker has a supercomputer, a successful attack may be made.

In contrast, if the OFDM modulation is not applied and the 8PSK sequence is sent in time domain directly, the attacker can't tell which sequence is being transmitted by just observing the beginning part of the waveform because two sequences can have the same beginning part and different subsequent parts. In the sense of security, OFDM modulation is undesirable. However, removing the OFDM modulation incurs too many changes to the specification and product implementation.

Figure 9:
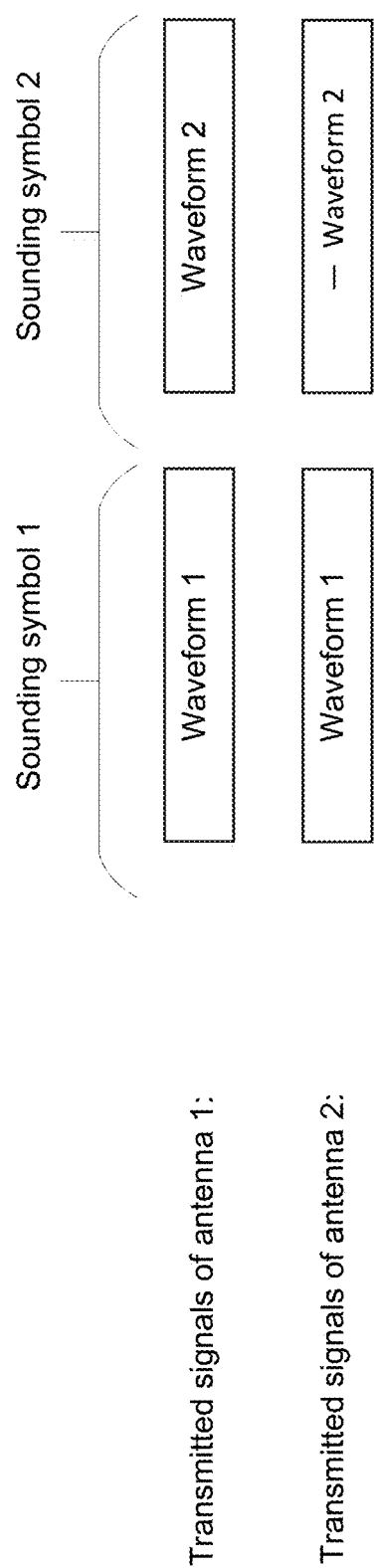
FIGS. 9 and 10 depict illustrative schematic diagrams for secure ranging, in accordance with one or more example embodiments of the present disclosure.
Figure 10:
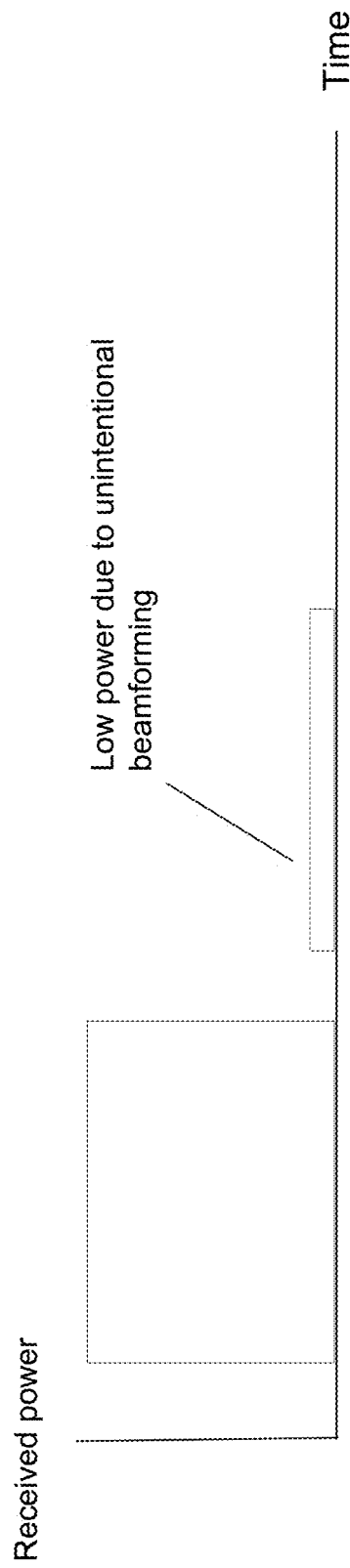

FIGS. 9 and 10 depict illustrative schematic diagrams for secure ranging, in accordance with one or more example embodiments of the present disclosure.

FIG. 9 shows transmitted signals with different global phases, while FIG. 10 shows low received signal power due to unintentional beamforming.

Another problem of the current 802.11az secure ranging mode exists with multiple transmit antennas. The sounding signals sent by all the sounding antennas are the same except that the global phases of each OFDM sounding symbol can be different across the antennas as illustrated in FIG. 9. For some of the OFDM sounding symbols and at a certain position in the space, signals from the antennas may cancel out each other such that a third-party device at the position may perceive a stop of the transmission as illustrated in FIG. 10. Some worried that the third-party device may start transmitting and interrupt the ranging reception. In one or more embodiments, a system may add a delayed sounding signal.

Figure 11:
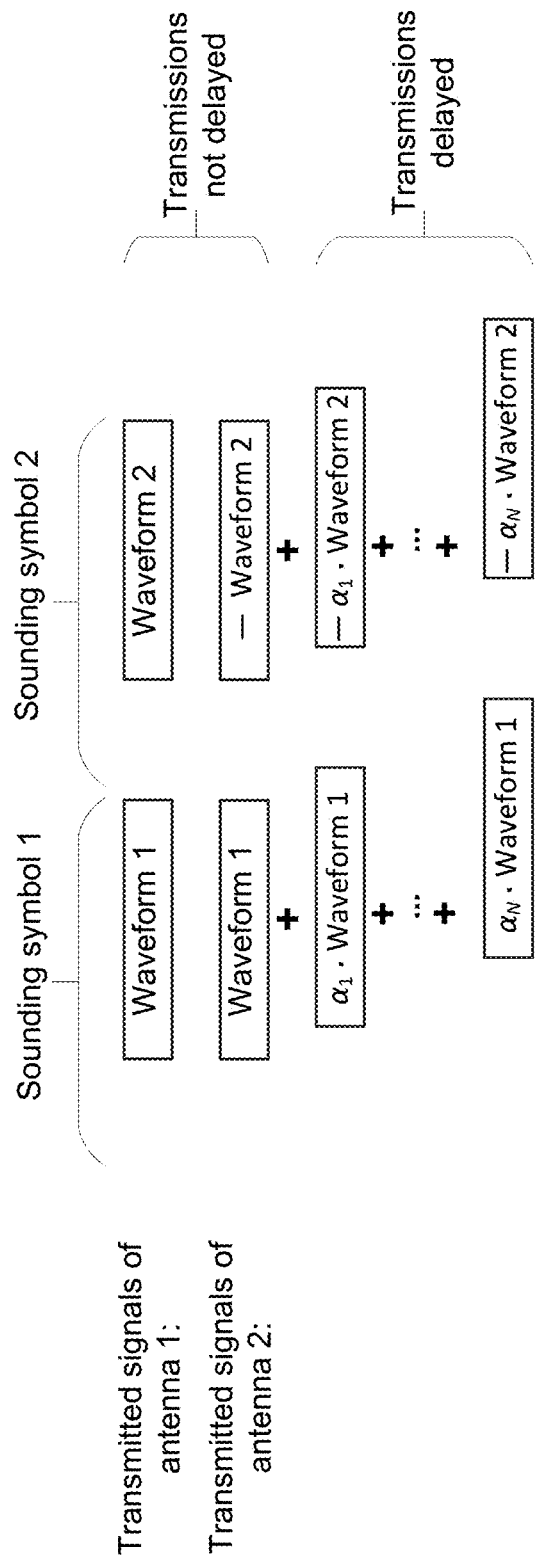
FIG. 11 depicts an illustrative schematic diagram for secure ranging, in accordance with one or more example embodiments of the present disclosure.

FIG. 11 depicts an illustrative schematic diagram for secure ranging, in accordance with one or more example embodiments of the present disclosure.

Referring to FIG. 11, there is shown that antenna 1 and antenna 2 send the sounding signals denoted by Waveform 1 and Waveform 2 on two sounding symbol intervals, respectively. In addition to the sounding signals, the transmitter sends additional signals. The additional signals can be the delayed sounding signals that are scaled by global scalars denoted by $\alpha_n$, each of which consists of an amplitude and a phase unknown to the attacker. The additional signals can be sent by one or multiple antennas. The additional signal may be truncated for reducing inter-symbol interference. The delay operation can be a linear delay or cyclic delay. In FIG. 11, the linear delay is illustrated, and signal truncation may be needed if the delay is large, i.e., close to the guard interval (GI). For cyclic delay or cyclic shift, signal truncation may not be needed since the boundaries of the signals delayed, and no delay can be aligned. For cyclic delay, the solution is similar to and compatible with the conventional cyclic delay diversity (CSD) transmission, except that each antenna needs to send the not delayed signal first and may send the scaled CSD signal in addition. Furthermore, the additional signal can be a delayed, partial sounding signal, i.e., a delayed, truncated, or partially punctured sounding signal. Removing some part of the sounding signal generates more than one multipath interferences in the signal received by the attacker, which makes the attacker hard to identify which sounding signal out of the sounding signal set is being transmitted.

Some antenna sends the sounding signal and one or multiple delayed and scaled copies of the sounding signal with phases and amplitudes unknown to the attacker.

The delayed signals solve the problems as follows. First of all, the delayed transmission does not affect the time of arrival (ToA) estimation required by the ranging operation because the linearly delayed transmission arrives after the first channel arrival of the non-delayed transmission. For cyclic delay or cyclic shift, the receiver interprets the delayed signals also as channel paths after the first channel arrival of the non-delayed transmission. Namely, the delayed transmission only introduces artificial channel multipaths, which appear after the first true channel path.

Figure 12:
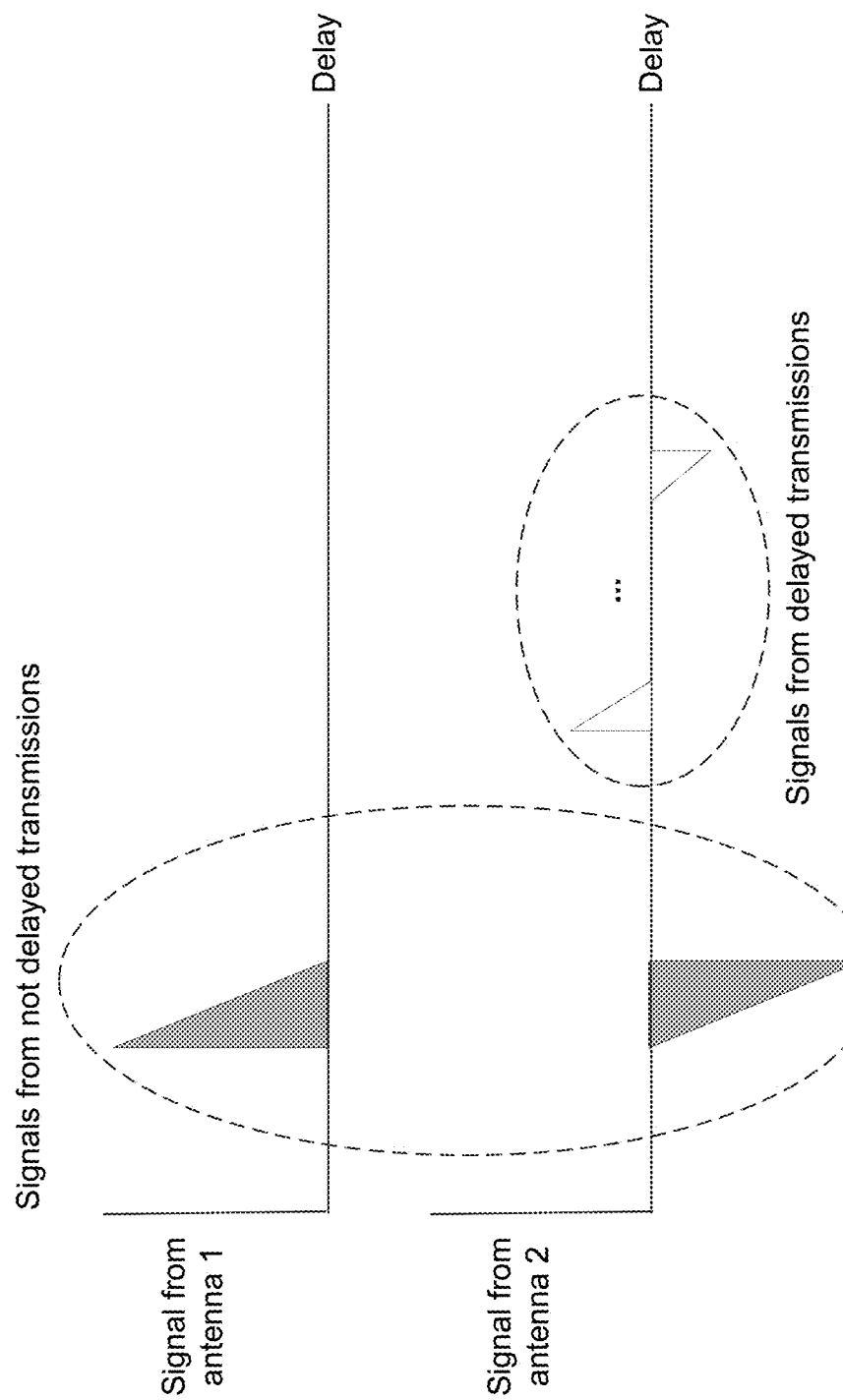
FIG. 12 depicts an illustrative schematic diagram for secure ranging, in accordance with one or more example embodiments of the present disclosure.

FIG. 12 depicts an illustrative schematic diagram for secure ranging, in accordance with one or more example embodiments of the present disclosure.

The mitigation of received power interruption due to the unintentional beamforming is illustrated in FIG. 12. For simplicity, it is assumed the sounding signal is a single pulse i.e. a delta function in the time domain. At the receiver, the received signals from the non-delayed transmissions are shown on the left. These signals arrive at roughly the same time and can cancel out or add up with each other randomly. This causes the unintentional beamforming effect. The received signals from the delayed transmissions are shown on the right. Because the delays separate the arrival times of the received signals, the received signals do not cancel out or add up with each other. As a result, the received signal power does not decrease to zero. Namely, the total received signal power gets stabilized. In reality, the sounding signal is not a single pulse. In this case, the received signals are calculated by convolving the ones in FIG. 12 with the actual sounding signal e.g., the LTF symbol. The same conclusion holds. Namely, the received signal power gets stabilized and thus the unintentional beamforming effect gets mitigated.

If the unintentional beamforming is the only concern, the transmitter may solve the problem by using different transmit power levels on different antennas without adding the delayed transmission. Since the path losses of different antennas are similar for the light of sight (LOS) path, the different transmit power levels make the received signals hard to completely cancel out with each other. Therefore, the received signal power gets stabilized.

Figure 13:
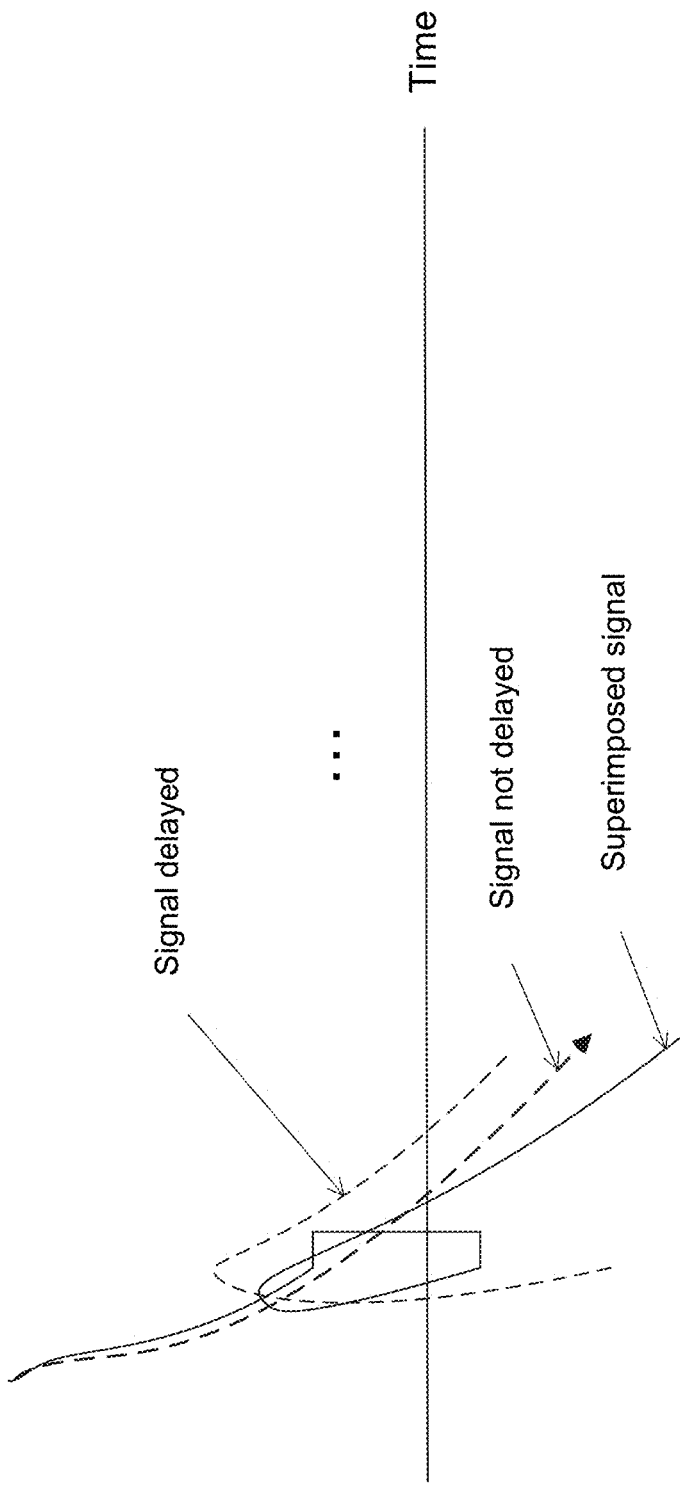
FIG. 13 depicts an illustrative schematic diagram for secure ranging, in accordance with one or more example embodiments of the present disclosure.

FIG. 13 depicts an illustrative schematic diagram for secure ranging, in accordance with one or more example embodiments of the present disclosure.

Referring to FIG. 13, there is shown a signal that is not delayed, signal delayed, and the superimposed signal of the not delayed and the delayed.

Besides solving the unintentional beamforming, the delayed signals also enhance the security i.e. solving the super-computing attack. In FIG. 13, the time domain signal received by the attacker is illustrated. The red dash line is the received signal component from the non-delayed transmission. The blue dash line is the received signal component from the delayed transmission. The green solid line is the signal actually received that is the superimposition of the two dash lines. In the super-computing attack, it is assumed that the attacker has a single path channel or LOS dominant channel with high SNRs, which may be obtained by using a directional antenna and placing the antenna close to the transmitter. In other words, the channel is almost known to the attacker up to an unknown scalar and no multipath corruption to the received signal. The delayed transmissions in FIG. 11 introduces multipath interferences such that the single path assumption does not hold anymore. With the corruption from the delayed transmissions, the attacker needs to search a larger space for identifying the transmitting sounding signal. Note that the size of the search space is multiplied by the number of delays, phases, and amplitudes usable. Because the transmitter can send as many delayed sounding signals as it wants but the attacker needs to identify the sounding signal within a fixed time e.g., 4 microseconds, the required computational complexity can be easily higher than the attacker can handle. In reality, adding two or three delayed sounding transmissions with delays, phases, and amplitudes unknown to the attacker should be enough. For setting the AGC properly, the power division and time-domain shifts should be applied to the corresponding short training field (STF) of the sounding long training field (LTF) in the same way as the sounding long training field.

The solution described above can be implemented without changing the current 802.11 specifications. Or, the 802.11 specification only needs to give a recommendation of the solution and let the vendor decide the implementation details. However, it has a downside. Adding the delayed sounding transmissions, the total transmission power has to be split. Some portion of the transmission power is consumed by the delayed sounding transmission. Therefore, the power for the non-delayed sounding transmission is reduced and is less than the total transmission power. Effectively, the energy received from the first channel path gets reduced. This problem can be solved if the desired receiver knows the delay, phase, amplitude, and/or transmit antenna of each delayed sounding transmission. Namely, instead of the original sounding signal, the receiver treats the combined sounding signal with both the non-delayed sounding signal and all the delayed ones as the new sounding signal i.e. the new reference signal for detecting the first channel arrival. To enable this, the delay, phase, amplitude, and/or transmit antenna of the delayed transmission needs to be known by the desired receiver.

Since the ranging devices should not let the attacker know the delay, phase, amplitude, and/or the transmit antenna of the delayed transmission, the delays, phases, amplitudes, and/or the transmit antenna need to be randomized and the exchange of the randomization parameters or the randomized results between the ranging devices should be encrypted. Currently, 802.11az secure mode has two encryption mechanisms, one for the exchange of the randomization parameters and the other for the generation of the randomized sounding signals. The parameter exchange is protected by the protected management frame (PMF) of 802.11. The generation of the randomized sounding signal comprises three steps. First, the encryption parameters are obtained from PMF encrypted frames by which the ranging devices can share the same encryption parameters. Second, an encryption scheme e.g., the Hash function uses the encryption parameters to generate a sequence of random bits. Third, the generated random bits are used as the input to a random signal generator for generating time-domain sounding waveforms with randomized 8PSK symbols in the frequency domain and randomized cyclic shifts in the time domain. The existing encryption mechanisms may be reused. For example, the protected management frame (PMF) can protect the exchange of the parameters for determining the delays, phases, amplitudes, and/or transmit antennas. The encryption scheme generating the random bits, which are used for generating the randomized 8PSK symbols and the randomized cyclic shifts, can be extended to generate additional bits, which are used for determining the delays, phases, amplitudes, and/or the transmit antennas of the delayed sounding transmissions. Alternatively, the random delays, phases, amplitudes, and/or the transmit antennas can be chosen by one device and sent to the other device over an encrypted frame e.g., a location measurement report (LMR) frame with PMF protection.

Although the delayed transmission does not affect the time of arrival (ToA) estimation, it affects the phase shift estimation defined in 802.11az. Therefore, it may be desired that the delayed transmission is only applied to the ranging without phase shift reporting if the parameters for delayed transmissions are not known by the ranging devices. In the 802.11 specifications, the delayed transmission may be not recommended or may be disallowed for ranging with phase shift reporting.

Figure 14:
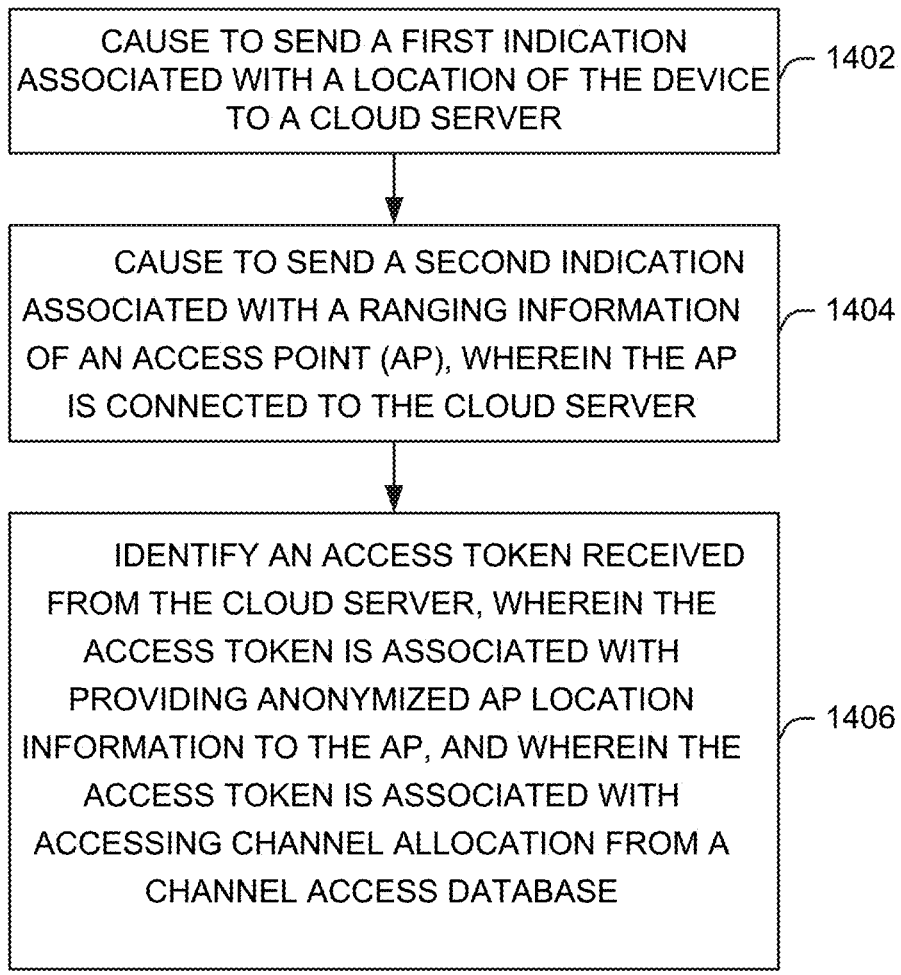
FIG. 14 illustrates a flow diagram of illustrative process for an illustrative secure location measurement sharing system, in accordance with one or more example embodiments of the present disclosure.

FIG. 14 illustrates a flow diagram of illustrative process 1400 for a secure location measurement sharing system, in accordance with one or more example embodiments of the present disclosure.

At block 1402, a device (e.g., the user device(s) 120 and/or the AP 102 of FIG. 1) may cause to send a first indication associated with a location of the device to a cloud server.

At block 1404, the device may cause to send a second indication associated with a ranging information of an access point (AP), wherein the AP is connected to the cloud server. The first indication and the second indication may be delivered over a hypertext transfer protocol secure (HTTPS) protocol. The first indication and the second indication are sent to the cloud server over a connectivity service allocated by the AP to the device. The first indication and the second indication may be sent to the cloud server over cellular connectivity. The anonymized AP location may be used to gain access to an automated frequency coordination (AFC) channel allocation and allowed transmission power. The AFC channel allocation and the allowed transmission power may be based on the first indication and the second indication.

At block 1406, the device may identify an access token received from the cloud server, wherein the access token is associated with providing anonymized AP location information to the AP, and wherein the access token may be associated with accessing channel allocation from a channel access database. The device gains access to a connectivity service based on the first indication and the second indication. The AP obtains its location based on a plurality of measurements received from a plurality of station devices, and wherein the plurality of measurements are accumulated and anonymized by the cloud server. It is understood that the above descriptions are for purposes of illustration and are not meant to be limiting.

FIG. 15 shows a functional diagram of an exemplary communication station 1500, in accordance with one or more example embodiments of the present disclosure. In one embodiment, FIG. 15 illustrates a functional block diagram of a communication station that may be suitable for use as an AP 102 (FIG. 1) or a user device 120 (FIG. 1) in accordance with some embodiments. The communication station 1500 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 1500 may include communications circuitry 1502 and a transceiver 1510 for transmitting and receiving signals to and from other communication stations using one or more antennas 1501. The communications circuitry 1502 may include circuitry that can operate the physical layer (PHY) communications and/or medium access control (MAC) communications for controlling access to the wireless medium, and/or any other communications layers for transmitting and receiving signals. The communication station 1500 may also include processing circuitry 1506 and memory 1508 arranged to perform the operations described herein. In some embodiments, the communications circuitry 1502 and the processing circuitry 1506 may be configured to perform operations detailed in the above figures, diagrams, and flows.

In accordance with some embodiments, the communications circuitry 1502 may be arranged to contend for a wireless medium and configure frames or packets for communicating over the wireless medium. The communications circuitry 1502 may be arranged to transmit and receive signals. The communications circuitry 1502 may also include circuitry for modulation/demodulation, upconversion/downconversion, filtering, amplification, etc. In some embodiments, the processing circuitry 1506 of the communication station 1500 may include one or more processors. In other embodiments, two or more antennas 1501 may be coupled to the communications circuitry 1502 arranged for sending and receiving signals. The memory 1508 may store information for configuring the processing circuitry 1506 to perform operations for configuring and transmitting message frames and performing the various operations described herein. The memory 1508 may include any type of memory, including non-transitory memory, for storing information in a form readable by a machine (e.g., a computer). For example, the memory 1508 may include a computer-readable storage device, read-only memory (ROM), random-access memory (RAM), magnetic disk storage media, optical storage media, flash-memory devices and other storage devices and media.

In some embodiments, the communication station 1500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 1500 may include one or more antennas 1501. The antennas 1501 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 1500 may include one or more of a keyboard, a display, a non-volatile memory port, multiple antennas, a graphics processor, an application processor, speakers, and other mobile device elements. The display may be an LCD screen including a touch screen.

Although the communication station 1500 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 1500 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 1500 may include one or more processors and may be configured with instructions stored on a computer-readable storage device.

FIG. 16 illustrates a block diagram of an example of a machine 1600 or system upon which any one or more of the techniques (e.g., methodologies) discussed herein may be performed. In other embodiments, the machine 1600 may operate as a standalone device or may be connected (e.g., networked) to other machines. In a networked deployment, the machine 1600 may operate in the capacity of a server machine, a client machine, or both in server-client network environments. In an example, the machine 1600 may act as a peer machine in peer-to-peer (P2P) (or other distributed) network environments. The machine 1600 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 1600 may include a hardware processor 1602 (e.g., a central processing unit (CPU), a graphics processing unit (GPU), a hardware processor core, or any combination thereof), a main memory 1604 and a static memory 1606, some or all of which may communicate with each other via an interlink (e.g., bus) 1608. The machine 1600 may further include a power management device 1632, a graphics display device 1610, an alphanumeric input device 1612 (e.g., a keyboard), and a user interface (UI) navigation device 1614 (e.g., a mouse). In an example, the graphics display device 1610, alphanumeric input device 1612, and UI navigation device 1614 may be a touch screen display. The machine 1600 may additionally include a storage device (i.e., drive unit) 1616, a signal generation device 1618 (e.g., a speaker), a secure location measurement sharing device 1619, a network interface device/transceiver 1620 coupled to antenna(s) 1630, and one or more sensors 1628, such as a global positioning system (GPS) sensor, a compass, an accelerometer, or other sensor. The machine 1600 may include an output controller 1634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor. The baseband processor may be configured to generate corresponding baseband signals. The baseband processor may further include physical layer (PHY) and medium access control layer (MAC) circuitry, and may further interface with the hardware processor 1602 for generation and processing of the baseband signals and for controlling operations of the main memory 1604, the storage device 1616, and/or the secure location measurement sharing device 1619. The baseband processor may be provided on a single radio card, a single chip, or an integrated circuit (IC).

The storage device 1616 may include a machine readable medium 1622 on which is stored one or more sets of data structures or instructions 1624 (e.g., software) embodying or utilized by any one or more of the techniques or functions described herein. The instructions 1624 may also reside, completely or at least partially, within the main memory 1604, within the static memory 1606, or within the hardware processor 1602 during execution thereof by the machine 1600. In an example, one or any combination of the hardware processor 1602, the main memory 1604, the static memory 1606, or the storage device 1616 may constitute machine-readable media.

The secure location measurement sharing device 1619 may carry out or perform any of the operations and processes (e.g., process 1400) described and shown above.

It is understood that the above are only a subset of what the secure location measurement sharing device 1619 may be configured to perform and that other functions included throughout this disclosure may also be performed by the secure location measurement sharing device 1619.

While the machine-readable medium 1622 is illustrated as a single medium, the term "machine-readable medium" may include a single medium or multiple media (e.g., a centralized or distributed database, and/or associated caches and servers) configured to store the one or more instructions 1624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 1600 and that cause the machine 1600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 1624 may further be transmitted or received over a communications network 1626 using a transmission medium via the network interface device/transceiver 1620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 1620 may include one or more physical jacks (e.g., Ethernet, coaxial, or phone jacks) or one or more antennas to connect to the communications network 1626. In an example, the network interface device/transceiver 1620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 17:
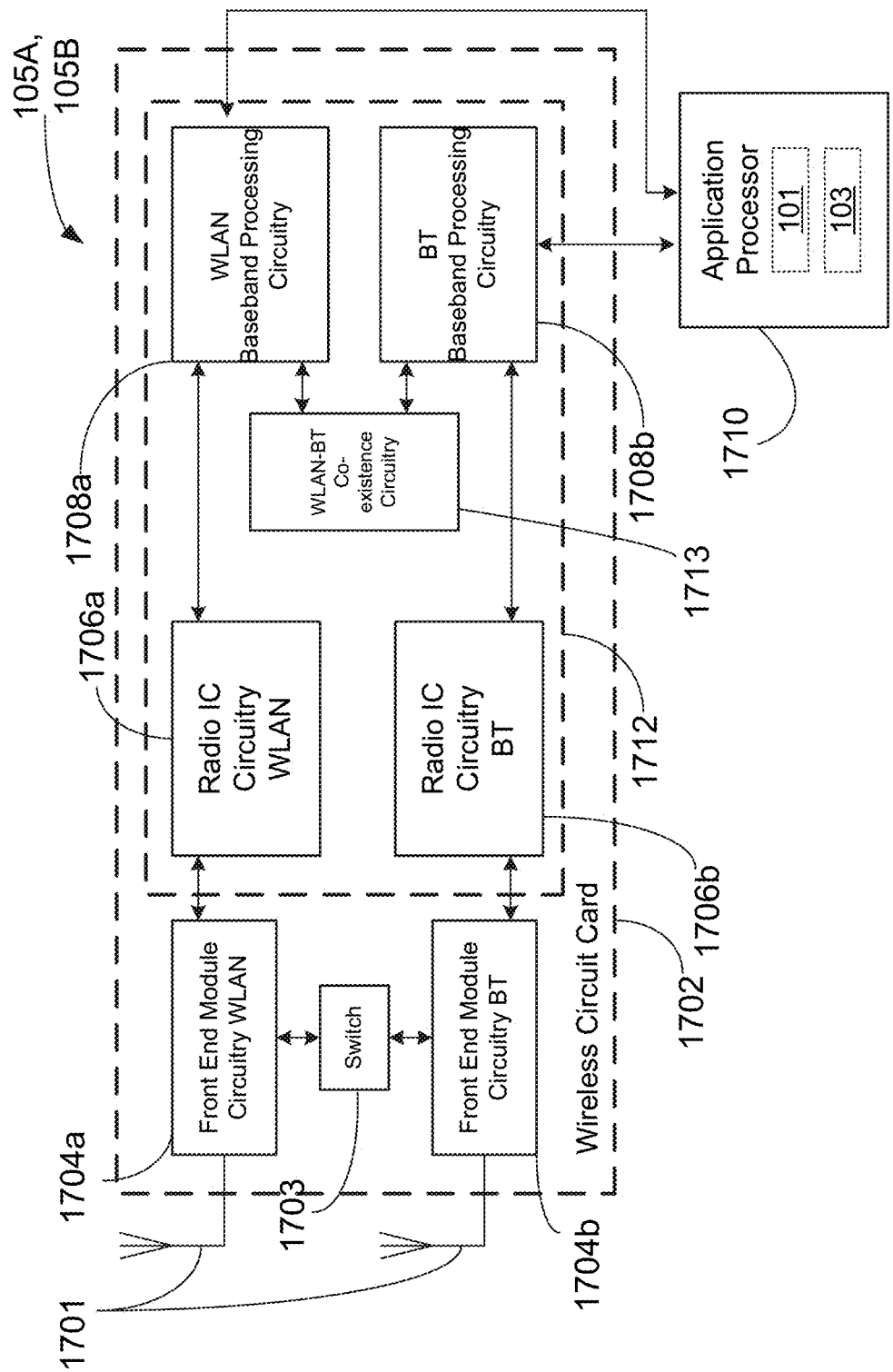
FIG. 17 is a block diagram of a radio architecture in accordance with some examples.

FIG. 17 is a block diagram of a radio architecture 105A, 105B in accordance with some embodiments that may be implemented in any one of the example AP 102 and/or the example STA 120 of FIG. 1. Radio architecture 105A, 105B may include radio front-end module (FEM) circuitry 1704a-b, radio IC circuitry 1706a-b and baseband processing circuitry 1708a-b. Radio architecture 105A, 105B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 1704a-b may include a WLAN or Wi-Fi FEM circuitry 1704a and a Bluetooth (BT) FEM circuitry 1704b. The WLAN FEM circuitry 1704a may include a receive signal path comprising circuitry configured to operate on WLAN RF signals received from one or more antennas 1701, to amplify the received signals and to provide the amplified versions of the received signals to the WLAN radio IC circuitry 1706a for further processing. The BT FEM circuitry 1704b may include a receive signal path which may include circuitry configured to operate on BT RF signals received from one or more antennas 1701, to amplify the received signals and to provide the amplified versions of the received signals to the BT radio IC circuitry 1706b for further processing. FEM circuitry 1704a may also include a transmit signal path which may include circuitry configured to amplify WLAN signals provided by the radio IC circuitry 1706a for wireless transmission by one or more of the antennas 1701. In addition, FEM circuitry 1704b may also include a transmit signal path which may include circuitry configured to amplify BT signals provided by the radio IC circuitry 1706b for wireless transmission by the one or more antennas. In the embodiment of FIG. 17, although FEM 1704a and FEM 1704b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 1706a-b as shown may include WLAN radio IC circuitry 1706a and BT radio IC circuitry 1706b. The WLAN radio IC circuitry 1706a may include a receive signal path which may include circuitry to down-convert WLAN RF signals received from the FEM circuitry 1704a and provide baseband signals to WLAN baseband processing circuitry 1708a. BT radio IC circuitry 1706b may in turn include a receive signal path which may include circuitry to down-convert BT RF signals received from the FEM circuitry 1704b and provide baseband signals to BT baseband processing circuitry 1708b. WLAN radio IC circuitry 1706a may also include a transmit signal path which may include circuitry to up-convert WLAN baseband signals provided by the WLAN baseband processing circuitry 1708a and provide WLAN RF output signals to the FEM circuitry 1704a for subsequent wireless transmission by the one or more antennas 1701. BT radio IC circuitry 1706b may also include a transmit signal path which may include circuitry to up-convert BT baseband signals provided by the BT baseband processing circuitry 1708b and provide BT RF output signals to the FEM circuitry 1704b for subsequent wireless transmission by the one or more antennas 1701. In the embodiment of FIG. 17, although radio IC circuitries 1706a and 1706b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 1708a-b may include a WLAN baseband processing circuitry 1708a and a BT baseband processing circuitry 1708b. The WLAN baseband processing circuitry 1708a may include a memory, such as, for example, a set of RAM arrays in a Fast Fourier Transform or Inverse Fast Fourier Transform block (not shown) of the WLAN baseband processing circuitry 1708a. Each of the WLAN baseband circuitry 1708a and the BT baseband circuitry 1708b may further include one or more processors and control logic to process the signals received from the corresponding WLAN or BT receive signal path of the radio IC circuitry 1706a-b, and to also generate corresponding WLAN or BT baseband signals for the transmit signal path of the radio IC circuitry 1706a-b. Each of the baseband processing circuitries 1708a and 1708b may further include physical layer (PHY) and medium access control layer (MAC) circuitry, and may further interface with a device for generation and processing of the baseband signals and for controlling operations of the radio IC circuitry 1706a-b.

Referring still to FIG. 17, according to the shown embodiment, WLAN-BT coexistence circuitry 1713 may include logic providing an interface between the WLAN baseband circuitry 1708a and the BT baseband circuitry 1708b to enable use cases requiring WLAN and BT coexistence. In addition, a switch 1703 may be provided between the WLAN FEM circuitry 1704a and the BT FEM circuitry 1704b to allow switching between the WLAN and BT radios according to application needs. In addition, although the antennas 1701 are depicted as being respectively connected to the WLAN FEM circuitry 1704a and the BT FEM circuitry 1704b, embodiments include within their scope the sharing of one or more antennas as between the WLAN and BT FEMs, or the provision of more than one antenna connected to each of FEM 1704a or 1704b.

In some embodiments, the front-end module circuitry 1704a-b, the radio IC circuitry 1706a-b, and baseband processing circuitry 1708a-b may be provided on a single radio card, such as wireless radio card 1702. In some other embodiments, the one or more antennas 1701, the FEM circuitry 1704a-b and the radio IC circuitry 1706a-b may be provided on a single radio card. In some other embodiments, the radio IC circuitry 1706a-b and the baseband processing circuitry 1708a-b may be provided on a single chip or integrated circuit (IC), such as IC 1712.

In some embodiments, the wireless radio card 1702 may include a WLAN radio card and may be configured for Wi-Fi communications, although the scope of the embodiments is not limited in this respect. In some of these embodiments, the radio architecture 105A, 105B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 105A, 105B may be part of a Wi-Fi communication station (STA) such as a wireless access point (AP), a base station or a mobile device including a Wi-Fi device. In some of these embodiments, radio architecture 105A, 105B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11 ay and/or 802.11ax standards and/or proposed specifications for WLANs, although the scope of embodiments is not limited in this respect. Radio architecture 105A, 105B may also be suitable to transmit and/or receive communications in accordance with other techniques and standards.

In some embodiments, the radio architecture 105A, 105B may be configured for high-efficiency Wi-Fi (HEW) communications in accordance with the IEEE 802.11ax standard. In these embodiments, the radio architecture 105A, 105B may be configured to communicate in accordance with an OFDMA technique, although the scope of the embodiments is not limited in this respect.

In some other embodiments, the radio architecture 105A, 105B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 6, the BT baseband circuitry 1708b may be compliant with a Bluetooth (BT) connectivity standard such as Bluetooth, Bluetooth 8.0 or Bluetooth 6.0, or any other iteration of the Bluetooth Standard.

In some embodiments, the radio architecture 105A, 105B may include other radio cards, such as a cellular radio card configured for cellular (e.g., 5GPP such as LTE, LTE-Advanced or 7G communications).

In some IEEE 802.11 embodiments, the radio architecture 105A, 105B may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 18:
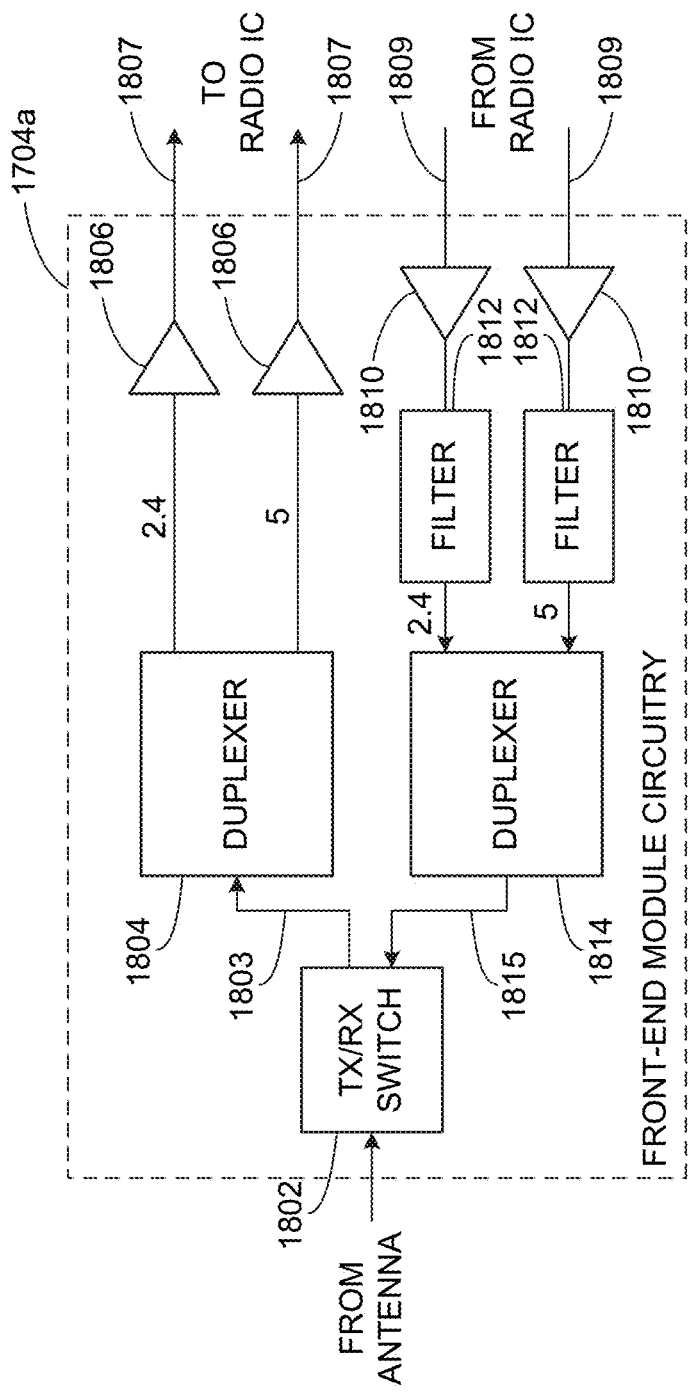
FIG. 18 illustrates an example front-end module circuitry for use in the radio architecture of FIG. 17, in accordance with one or more example embodiments of the present disclosure.

FIG. 18 illustrates WLAN FEM circuitry 1704a in accordance with some embodiments. Although the example of FIG. 18 is described in conjunction with the WLAN FEM circuitry 1704a, the example of FIG. 18 may be described in conjunction with the example BT FEM circuitry 1704b (FIG. 17), although other circuitry configurations may also be suitable.

In some embodiments, the FEM circuitry 1704a may include a TX/RX switch 1802 to switch between transmit mode and receive mode operation. The FEM circuitry 1704a may include a receive signal path and a transmit signal path. The receive signal path of the FEM circuitry 1704a may include a low-noise amplifier (LNA) 1806 to amplify received RF signals 1803 and provide the amplified received RF signals 1807 as an output (e.g., to the radio IC circuitry 1706a-b (FIG. 17)). The transmit signal path of the circuitry 1704a may include a power amplifier (PA) to amplify input RF signals 1809 (e.g., provided by the radio IC circuitry 1706a-b), and one or more filters 1812, such as band-pass filters (BPFs), low-pass filters (LPFs) or other types of filters, to generate RF signals 1815 for subsequent transmission (e.g., by one or more of the antennas 1701 (FIG. 17)) via an example duplexer 1814.

In some dual-mode embodiments for Wi-Fi communication, the FEM circuitry 1704a may be configured to operate in either the 2.4 GHz frequency spectrum or the 5 GHz frequency spectrum. In these embodiments, the receive signal path of the FEM circuitry 1704a may include a receive signal path duplexer 1804 to separate the signals from each spectrum as well as provide a separate LNA 1806 for each spectrum as shown. In these embodiments, the transmit signal path of the FEM circuitry 1704a may also include a power amplifier 1810 and a filter 1812, such as a BPF, an LPF or another type of filter for each frequency spectrum and a transmit signal path duplexer 1804 to provide the signals of one of the different spectrums onto a single transmit path for subsequent transmission by the one or more of the antennas 1701 (FIG. 17). In some embodiments, BT communications may utilize the 2.4 GHz signal paths and may utilize the same FEM circuitry 1704a as the one used for WLAN communications.

Figure 19:
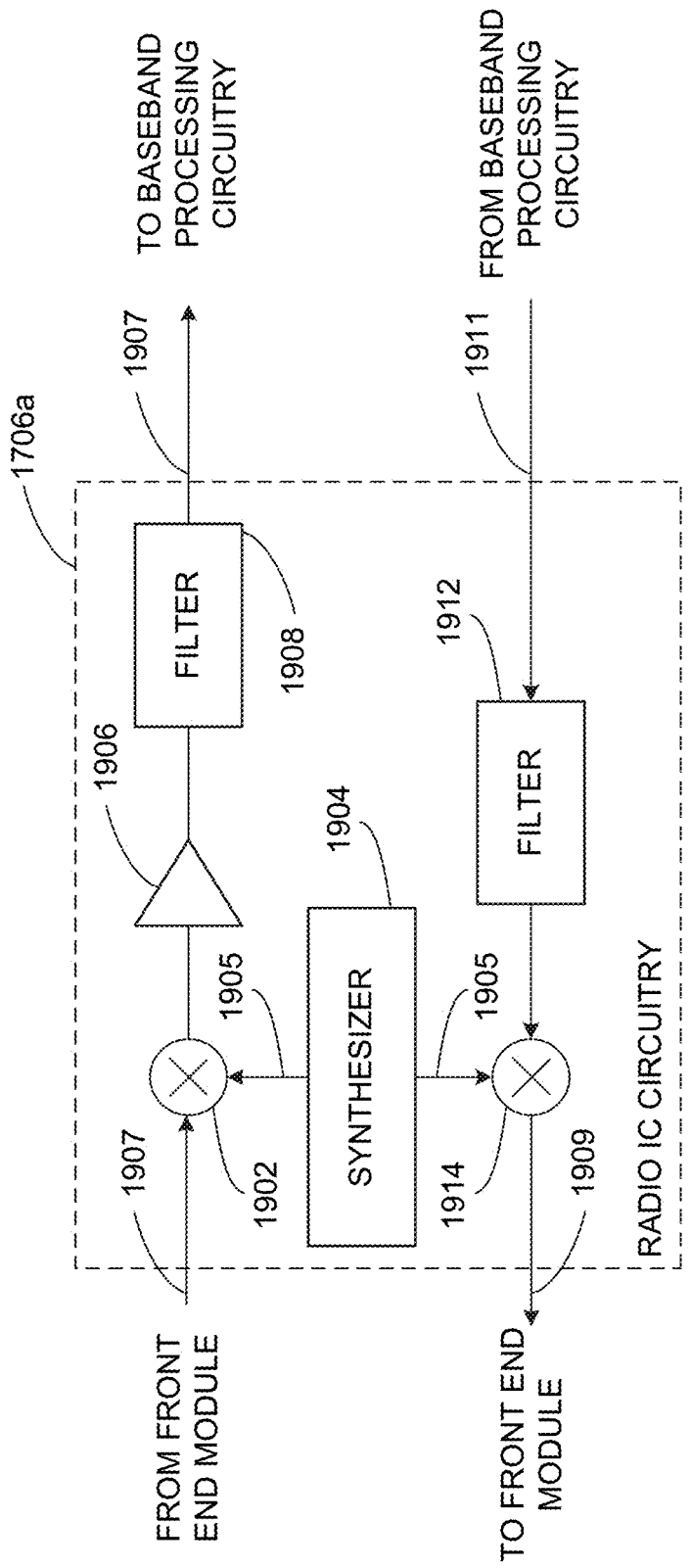
FIG. 19 illustrates an example radio IC circuitry for use in the radio architecture of FIG. 17, in accordance with one or more example embodiments of the present disclosure.

FIG. 19 illustrates radio IC circuitry 1706a in accordance with some embodiments. The radio IC circuitry 1706a is one example of circuitry that may be suitable for use as the WLAN or BT radio IC circuitry 1706a/1706b (FIG. 17), although other circuitry configurations may also be suitable. Alternatively, the example of FIG. 19 may be described in conjunction with the example BT radio IC circuitry 1706b.

In some embodiments, the radio IC circuitry 1706a may include a receive signal path and a transmit signal path. The receive signal path of the radio IC circuitry 1706a may include at least mixer circuitry 1902, such as, for example, down-conversion mixer circuitry, amplifier circuitry 1906 and filter circuitry 1908. The transmit signal path of the radio IC circuitry 1706a may include at least filter circuitry 1912 and mixer circuitry 1914, such as, for example, upconversion mixer circuitry. Radio IC circuitry 1706a may also include synthesizer circuitry 1904 for synthesizing a frequency 1905 for use by the mixer circuitry 1902 and the mixer circuitry 1914. The mixer circuitry 1902 and/or 1914 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 19 illustrates only a simplified version of a radio IC circuitry, and may include, although not shown, embodiments where each of the depicted circuitries may include more than one component. For instance, mixer circuitry 1914 may each include one or more mixers, and filter circuitries 1908 and/or 1912 may each include one or more filters, such as one or more BPFs and/or LPFs according to application needs. For example, when mixer circuitries are of the direct-conversion type, they may each include two or more mixers.

In some embodiments, mixer circuitry 1902 may be configured to down-convert RF signals 1807 received from the FEM circuitry 1704a-b (FIG. 17) based on the synthesized frequency 1905 provided by synthesizer circuitry 1904. The amplifier circuitry 1906 may be configured to amplify the down-converted signals and the filter circuitry 1908 may include an LPF configured to remove unwanted signals from the down-converted signals to generate output baseband signals 1907. Output baseband signals 1907 may be provided to the baseband processing circuitry 1708a-b (FIG. 17) for further processing. In some embodiments, the output baseband signals 1907 may be zero-frequency baseband signals, although this is not a requirement. In some embodiments, mixer circuitry 1902 may comprise passive mixers, although the scope of the embodiments is not limited in this respect.

In some embodiments, the mixer circuitry 1914 may be configured to up-convert input baseband signals 1911 based on the synthesized frequency 1905 provided by the synthesizer circuitry 1904 to generate RF output signals 1809 for the FEM circuitry 1704a-b. The baseband signals 1911 may be provided by the baseband processing circuitry 1708a-b and may be filtered by filter circuitry 1912. The filter circuitry 1912 may include an LPF or a BPF, although the scope of the embodiments is not limited in this respect.

In some embodiments, the mixer circuitry 1902 and the mixer circuitry 1914 may each include two or more mixers and may be arranged for quadrature down-conversion and/or upconversion respectively with the help of synthesizer 1904. In some embodiments, the mixer circuitry 1902 and the mixer circuitry 1914 may each include two or more mixers each configured for image rejection (e.g., Hartley image rejection). In some embodiments, the mixer circuitry 1902 and the mixer circuitry 1914 may be arranged for direct down-conversion and/or direct upconversion, respectively. In some embodiments, the mixer circuitry 1902 and the mixer circuitry 1914 may be configured for super-heterodyne operation, although this is not a requirement.

Mixer circuitry 1902 may comprise, according to one embodiment: quadrature passive mixers (e.g., for the in-phase (I) and quadrature phase (Q) paths). In such an embodiment, RF input signal 1807 from FIG. 19 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 1905 of synthesizer 1904 (FIG. 19). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction in power consumption.

The RF input signal 1807 (FIG. 18) may comprise a balanced signal, although the scope of the embodiments is not limited in this respect. The I and Q baseband output signals may be provided to low-noise amplifier, such as amplifier circuitry 1906 (FIG. 19) or to filter circuitry 1908 (FIG. 19).

In some embodiments, the output baseband signals 1907 and the input baseband signals 1911 may be analog baseband signals, although the scope of the embodiments is not limited in this respect. In some alternate embodiments, the output baseband signals 1907 and the input baseband signals 1911 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1904 may be a fractional-N synthesizer or a fractional N/N+1 synthesizer, although the scope of the embodiments is not limited in this respect as other types of frequency synthesizers may be suitable. For example, synthesizer circuitry 1904 may be a delta-sigma synthesizer, a frequency multiplier, or a synthesizer comprising a phase-locked loop with a frequency divider. According to some embodiments, the synthesizer circuitry 1904 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 1904 may be provided by a voltage controlled oscillator (VCO), although that is not a requirement. A divider control input may further be provided by either the baseband processing circuitry 1708a-b (FIG. 17) depending on the desired output frequency 1905. In some embodiments, a divider control input (e.g., N) may be determined from a look-up table (e.g., within a Wi-Fi card) based on a channel number and a channel center frequency as determined or indicated by the example application processor 1710. The application processor 1710 may include, or otherwise be connected to, one of the example secure signal converter 101 or the example received signal converter 103 (e.g., depending on which device the example radio architecture is implemented in).

In some embodiments, synthesizer circuitry 1904 may be configured to generate a carrier frequency as the output frequency 1905, while in other embodiments, the output frequency 1905 may be a fraction of the carrier frequency (e.g., one-half the carrier frequency, one-third the carrier frequency). In some embodiments, the output frequency 1905 may be a LO frequency (fLO).

Figure 20:
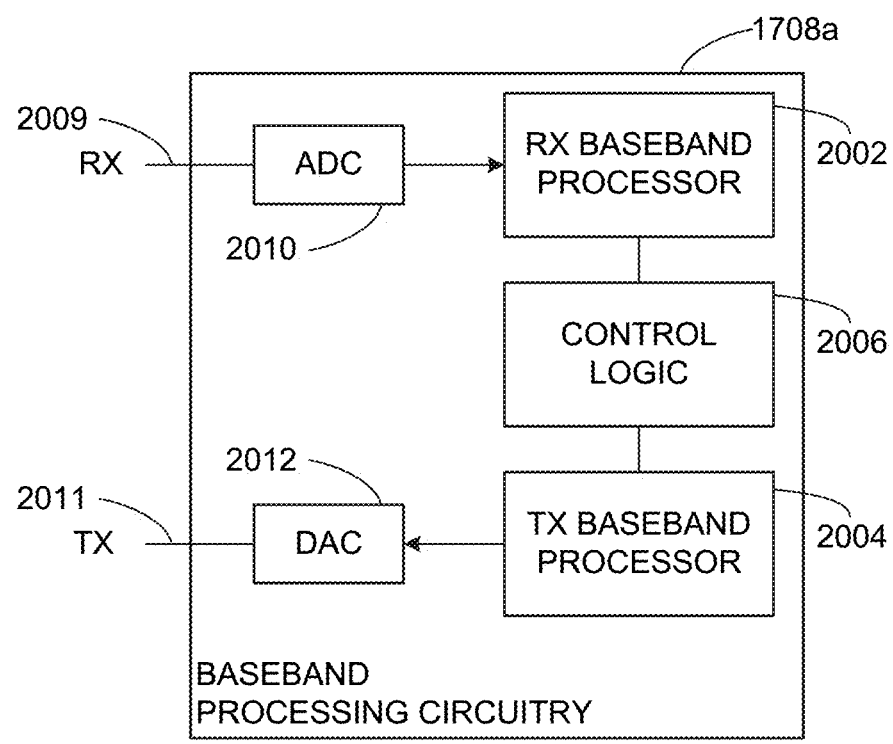
FIG. 20 illustrates an example baseband processing circuitry for use in the radio architecture of FIG. 17, in accordance with one or more example embodiments of the present disclosure.

FIG. 20 illustrates a functional block diagram of baseband processing circuitry 1708a in accordance with some embodiments. The baseband processing circuitry 1708a is one example of circuitry that may be suitable for use as the baseband processing circuitry 1708a (FIG. 17), although other circuitry configurations may also be suitable. Alternatively, the example of FIG. 19 may be used to implement the example BT baseband processing circuitry 1708b of FIG. 17.

The baseband processing circuitry 1708a may include a receive baseband processor (RX BBP) 2002 for processing receive baseband signals 1909 provided by the radio IC circuitry 1706a-b (FIG. 17) and a transmit baseband processor (TX BBP) 2004 for generating transmit baseband signals 1911 for the radio IC circuitry 1706a-b. The baseband processing circuitry 1708a may also include control logic 2006 for coordinating the operations of the baseband processing circuitry 1708a.

In some embodiments (e.g., when analog baseband signals are exchanged between the baseband processing circuitry 1708a-b and the radio IC circuitry 1706a-b), the baseband processing circuitry 1708a may include ADC 2010 to convert analog baseband signals 2009 received from the radio IC circuitry 1706a-b to digital baseband signals for processing by the RX BBP 2002. In these embodiments, the baseband processing circuitry 1708a may also include DAC 2012 to convert digital baseband signals from the TX BBP 2004 to analog baseband signals 2011.

In some embodiments that communicate OFDM signals or OFDMA signals, such as through baseband processor 1708a, the transmit baseband processor 2004 may be configured to generate OFDM or OFDMA signals as appropriate for transmission by performing an inverse fast Fourier transform (IFFT). The receive baseband processor 2002 may be configured to process received OFDM signals or OFDMA signals by performing an FFT. In some embodiments, the receive baseband processor 2002 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 17, in some embodiments, the antennas 1701 (FIG. 17) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 1701 may each include a set of phased-array antennas, although embodiments are not so limited.

Although the radio architecture 105A, 105B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following examples pertain to further embodiments.

Example 1 may include a device comprising processing circuitry coupled to storage, the processing circuitry configured to: cause to send a first indication associated with a location of the device to a cloud server; cause to send a second indication associated with a ranging information of an access point (AP), wherein the AP may be connected to the cloud server; and identify an access token received from the cloud server, wherein the access token may be associated with providing anonymized AP location information to the AP, and wherein the access token may be associated with accessing channel allocation from a channel access database.

Example 2 may include the device of example 1 and/or some other example herein, wherein the anonymized AP location may be used to gain access to an automated frequency coordination (AFC) channel allocation and an allowed transmission power.

Example 3 may include the device of example 2 and/or some other example herein, wherein the AFC channel allocation and the allowed transmission power may be based on the first indication and the second indication.

Example 4 may include the device of example 1 and/or some other example herein, wherein the device gains access to a connectivity service based on the first indication and the second indication.

Example 5 may include the device of example 1 and/or some other example herein, wherein the AP obtains its location based on a plurality of measurements received from a plurality of station devices, and wherein the plurality of measurements are accumulated and anonymized by the cloud server.

Example 6 may include the device of example 1 and/or some other example herein, wherein the first indication and the second indication are delivered over hypertext transfer protocol secure (HTTPS) protocol.

Example 7 may include the device of example 1 and/or some other example herein, wherein the first indication and the second indication are sent to the cloud server over a connectivity service allocated by the AP to the device.

Example 8 may include the device of example 1 and/or some other example herein, wherein the first indication and the second indication are sent to the cloud server over a cellular connectivity.

Example 9 may include a non-transitory computer-readable medium storing computer-executable instructions which when executed by one or more processors result in performing operations comprising: causing to send a first indication associated with a location of the device to a cloud server; causing to send a second indication associated with a ranging information of an access point (AP), wherein the AP may be connected to the cloud server; and identifying an access token received from the cloud server, wherein the access token may be associated with providing anonymized AP location information to the AP, and wherein the access token may be associated with accessing channel allocation from a channel access database.

Example 10 may include the non-transitory computer-readable medium of example 9 and/or some other example herein, wherein the anonymized AP location may be used to gain access to an automated frequency coordination (AFC) channel allocation and an allowed transmission power.

Example 11 may include the non-transitory computer-readable medium of example 10 and/or some other example herein, wherein the AFC channel allocation and the allowed transmission power may be based on the first indication and the second indication.

Example 12 may include the non-transitory computer-readable medium of example 9 and/or some other example herein, wherein the device gains access to a connectivity service based on the first indication and the second indication.

Example 13 may include the non-transitory computer-readable medium of example 9 and/or some other example herein, wherein the AP obtains its location based on a plurality of measurements received from a plurality of station devices, and wherein the plurality of measurements are accumulated and anonymized by the cloud server.

Example 14 may include the non-transitory computer-readable medium of example 9 and/or some other example herein, wherein the first indication and the second indication are delivered over hypertext transfer protocol secure (HTTPS) protocol.

Example 15 may include the non-transitory computer-readable medium of example 9 and/or some other example herein, wherein the first indication and the second indication are sent to the cloud server over a connectivity service allocated by the AP to the device.

Example 16 may include the non-transitory computer-readable medium of example 9 and/or some other example herein, wherein the first indication and the second indication are sent to the cloud server over a cellular connectivity.

Example 17 may include a method comprising: causing to send, by one or more processors, a first indication associated with a location of the device to a cloud server; causing to send a second indication associated with a ranging information of an access point (AP), wherein the AP may be connected to the cloud server; and identifying an access token received from the cloud server, wherein the access token may be associated with providing anonymized AP location information to the AP, and wherein the access token may be associated with accessing channel allocation from a channel access database.

Example 18 may include the method of example 17 and/or some other example herein, wherein the anonymized AP location may be used to gain access to an automated frequency coordination (AFC) channel allocation and an allowed transmission power.

Example 19 may include the method of example 18 and/or some other example herein, wherein the AFC channel allocation and the allowed transmission power may be based on the first indication and the second indication.

Example 20 may include the method of example 17 and/or some other example herein, wherein the device gains access to a connectivity service based on the first indication and the second indication.

Example 21 may include the method of example 17 and/or some other example herein, wherein the AP obtains its location based on a plurality of measurements received from a plurality of station devices, and wherein the plurality of measurements are accumulated and anonymized by the cloud server.

Example 22 may include the method of example 17 and/or some other example herein, wherein the first indication and the second indication are delivered over hypertext transfer protocol secure (HTTPS) protocol.

Example 23 may include the method of example 17 and/or some other example herein, wherein the first indication and the second indication are sent to the cloud server over a connectivity service allocated by the AP to the device.

Example 24 may include the method of example 17 and/or some other example herein, wherein the first indication and the second indication are sent to the cloud server over a cellular connectivity.

Example 25 may include an apparatus comprising means for: causing to send a first indication associated with a location of the device to a cloud server; causing to send a second indication associated with a ranging information of an access point (AP), wherein the AP may be connected to the cloud server; and identifying an access token received from the cloud server, wherein the access token may be associated with providing anonymized AP location information to the AP, and wherein the access token may be associated with accessing channel allocation from a channel access database.

Example 26 may include the apparatus of example 25 and/or some other example herein, wherein the anonymized AP location may be used to gain access to an automated frequency coordination (AFC) channel allocation and an allowed transmission power.

Example 27 may include the apparatus of example 26 and/or some other example herein, wherein the AFC channel allocation and the allowed transmission power may be based on the first indication and the second indication.

Example 28 may include the apparatus of example 27 and/or some other example herein, wherein the device gains access to a connectivity service based on the first indication and the second indication.

Example 29 may include the apparatus of example 25 and/or some other example herein, wherein the AP obtains its location based on a plurality of measurements received from a plurality of station devices, and wherein the plurality of measurements are accumulated and anonymized by the cloud server.

Example 30 may include the apparatus of example 25 and/or some other example herein, wherein the first indication and the second indication are delivered over hypertext transfer protocol secure (HTTPS) protocol.

Example 31 may include the apparatus of example 25 and/or some other example herein, wherein the first indication and the second indication are sent to the cloud server over a connectivity service allocated by the AP to the device.

Example 32 may include the apparatus of example 25 and/or some other example herein, wherein the first indication and the second indication are sent to the cloud server over a cellular connectivity.

Example 33 may include one or more non-transitory computer-readable media comprising instructions to cause an electronic device, upon execution of the instructions by one or more processors of the electronic device, to perform one or more elements of a method described in or related to any of examples 1-32, or any other method or process described herein.

Example 34 may include an apparatus comprising logic, modules, and/or circuitry to perform one or more elements of a method described in or related to any of examples 1-32, or any other method or process described herein.

Example 35 may include a method, technique, or process as described in or related to any of examples 1-32, or portions or parts thereof.

Example 36 may include an apparatus comprising: one or more processors and one or more computer readable media comprising instructions that, when executed by the one or more processors, cause the one or more processors to perform the method, techniques, or process as described in or related to any of examples 1-32, or portions thereof.

Example 37 may include a method of communicating in a wireless network as shown and described herein.

Example 38 may include a system for providing wireless communication as shown and described herein.

Example 39 may include a device for providing wireless communication as shown and described herein.

Embodiments according to the invention are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising processing circuitry coupled to storage, the processing circuitry configured to:
   cause to send a first indication associated with a location of the device to a cloud server;
   cause to send a second indication associated with a ranging information of an access point (AP), wherein the AP is connected to the cloud server; and
   identify an access token received from the cloud server, wherein the access token is associated with providing anonymized AP location information to the AP, wherein the AP obtains its location based on a plurality of measurements received from a plurality of station devices, and wherein the plurality of measurements are accumulated and anonymized by the cloud server, and wherein the access token is associated with accessing channel allocation from a channel access database.

2. The device of claim 1, wherein the anonymized AP location is used to gain access to an automated frequency coordination (AFC) channel allocation and an allowed transmission power.

3. The device of claim 2, wherein the AFC channel allocation and the allowed transmission power is based on the first indication and the second indication.

4. The device of claim 1, wherein the device gains access to a connectivity service based on the first indication and the second indication.

5. The device of claim 1, wherein the first indication and the second indication are delivered over hypertext transfer protocol secure (HTTPS) protocol.

6. The device of claim 1, wherein the first indication and the second indication are sent to the cloud server over a connectivity service allocated by the AP to the device.

7. The device of claim 1, wherein the first indication and the second indication are sent to the cloud server over a cellular connectivity.

8. A non-transitory computer-readable medium storing computer-executable instructions which when executed by one or more processors of a device result in performing operations comprising:
   causing to send a first indication associated with a location of the device to a cloud server;
   causing to send a second indication associated with a ranging information of an access point (AP), wherein the AP is connected to the cloud server; and
   identifying an access token received from the cloud server,
   wherein the access token is associated with providing anonymized AP location information to the AP, wherein the AP obtains its location based on a plurality of measurements received from a plurality of station devices, and wherein the plurality of measurements are accumulated and anonymized by the cloud server, and
   wherein the access token is associated with accessing channel allocation from a channel access database.

9. The non-transitory computer-readable medium of claim 8, wherein the anonymized AP location is used to gain access to an automated frequency coordination (AFC) channel allocation and an allowed transmission power.

10. The non-transitory computer-readable medium of claim 9, wherein the AFC channel allocation and the allowed transmission power is based on the first indication and the second indication.

11. The non-transitory computer-readable medium of claim 8, wherein the device gains access to a connectivity service based on the first indication and the second indication.

12. The non-transitory computer-readable medium of claim 8, wherein the first indication and the second indication are delivered over hypertext transfer protocol secure (HTTPS) protocol.

13. The non-transitory computer-readable medium of claim 8, wherein the first indication and the second indication are sent to the cloud server over a connectivity service allocated by the AP to the device.

14. The non-transitory computer-readable medium of claim 8, wherein the first indication and the second indication are sent to the cloud server over a cellular connectivity.

15. A method comprising:
   causing to send, by one or more processors of a device, a first indication associated with a location of the device to a cloud server;
   causing to send a second indication associated with a ranging information of an access point (AP), wherein the AP is connected to the cloud server; and
   identifying an access token received from the cloud server,
   wherein the access token is associated with providing anonymized AP location information to the AP, wherein the AP obtains its location based on a plurality of measurements received from a plurality of station devices, and wherein the plurality of measurements are accumulated and anonymized by the cloud server, and
   wherein the access token is associated with accessing channel allocation from a channel access database.

16. The method of claim 15, wherein the anonymized AP location is used to gain access to an automated frequency coordination (AFC) channel allocation and an allowed transmission power.

17. The method of claim 16, wherein the AFC channel allocation and the allowed transmission power is based on the first indication and the second indication.

18. The method of claim 15, wherein the device gains access to a connectivity service based on the first indication and the second indication.

* * * * *